United States Patent [19]
Carmichael et al.

[11] Patent Number: 5,864,712
[45] Date of Patent: Jan. 26, 1999

[54] METHOD AND APPARATUS FOR CONTROLLING (N+I) I/O CHANNELS WITH (N) DATA MANAGERS IN A HOMOGENOUS SOFTWARE PROGRAMMABLE ENVIRONMENT

[75] Inventors: Richard D. Carmichael, Longmont; Joel M. Ward; Michael A. Winchell, both of Fort Collins, all of Colo.

[73] Assignee: LSI Logic Corporation, Milpitas, Calif.

[21] Appl. No.: 777,858

[22] Filed: Dec. 31, 1996

Related U.S. Application Data

[63] Continuation of Ser. No. 488,427, Jun. 7, 1995, abandoned, which is a continuation-in-part of Ser. No. 407,439, Mar. 17, 1995, abandoned.

[51] Int. Cl.$^6$ .................................................. G06F 13/10
[52] U.S. Cl. .......................... 395/840; 395/855; 395/845; 395/873
[58] Field of Search .................................... 395/825, 826, 395/840, 441, 844, 841, 843, 848, 873, 855; 711/117

[56] References Cited

U.S. PATENT DOCUMENTS

| | | | |
|---|---|---|---|
| 4,371,932 | 2/1983 | Dinwiddie, Jr. et al. | 395/841 |
| 4,782,439 | 11/1988 | Borkar et al. | 364/200 |
| 4,805,137 | 2/1989 | Grant et al. | 364/900 |
| 4,807,121 | 2/1989 | Halford | 364/200 |
| 4,821,170 | 4/1989 | Bernick et al. | 364/200 |
| 4,831,523 | 5/1989 | Lewis et al. | 364/200 |
| 5,016,160 | 5/1991 | Lambeth et al. | 364/200 |
| 5,031,097 | 7/1991 | Kitakami et al. | 364/200 |
| 5,131,081 | 7/1992 | Mackenna et al. | 395/842 |
| 5,179,709 | 1/1993 | Bailey et al. | 395/843 |
| 5,185,878 | 2/1993 | Nguyen et al. | 395/841 |
| 5,206,933 | 4/1993 | Farrell et al. | 395/200 |
| 5,212,795 | 5/1993 | Hendry | 395/848 |

(List continued on next page.)

FOREIGN PATENT DOCUMENTS

| | | | |
|---|---|---|---|
| 0317481 | 5/1989 | European Pat. Off. | G06F 15/16 |
| 0530543 | 3/1993 | European Pat. Off. | G06F 13/32 |
| 0537401 | 4/1993 | European Pat. Off. | G06F 15/16 |
| 0549924 | 7/1993 | European Pat. Off. | G06F 13/28 |
| 9306553 | 4/1993 | WIPO | G06F 13/28 |

OTHER PUBLICATIONS

Programming Interface for Bus Master IDE Controller Revision 0.9; Jun. 14, 1994; Brad Hosler; Intel Corporation; pp. 1–6.

IBM Technical Disclosure Bulletin, Jan., 1994; DMA Controller Channel Interlocking; vol. 37, No. 1; pp. 337–342.

IBM Technical Disclosure Bulletin, Feb., 1995; Priority Scheme for Arithemetic Logic Unit and Dataflow Usage by P1394 Isochronous Hardware; vol. 38, No. 2; pp. 477–480.

*Primary Examiner*—Christopher B. Shin
*Attorney, Agent, or Firm*—David K. Lucente; Wayne P. Bailey

[57] ABSTRACT

A method an corresponding apparatus for improving the input/output performance of a computer system under the control of a multi-tasking, multi-threaded operating system. In particular, the invention provides an apparatus and method to interleave contiguous DMA scatter/gather sub blocks of a PRD table corresponding to a first I/O channel with contiguous DMA scatter/gather sub blocks of a PRD table corresponding to a second I/O channel, using a single data manager, while maintaining maximum media bandwidth. DMA block transfers are scheduled by the single data manager based on the availability of data from the I/O devices' buffer memories, thus minimizing both media or network idle time as well as minimizing I/O bus idle time. Near maximum aggregate bandwidth of multiple I/O buses and their associated devices is obtained. The apparatus and method thus provides significant performance advantages over prior techniques having two I/O channel systems implemented with a single data manager. The apparatus and methods of the present invention are also extended to encompass a plurality "n" of data managers interleaving contiguous block transfers among a larger plurality "n+i" of I/O devices.

17 Claims, 16 Drawing Sheets

U.S. PATENT DOCUMENTS

| | | | |
|---|---|---|---|
| 5,251,303 | 10/1993 | Fogg, Jr. et al. | 395/275 |
| 5,251,312 | 10/1993 | Sodos | 395/425 |
| 5,301,279 | 4/1994 | Riley et al. | 395/275 |
| 5,355,476 | 10/1994 | Fukumura | 395/600 |
| 5,367,639 | 11/1994 | Sodos | 395/275 |
| 5,386,532 | 1/1995 | Sodos | 395/425 |
| 5,388,219 | 2/1995 | Chan et al. | 395/825 |
| 5,388,237 | 2/1995 | Sodos | 395/425 |
| 5,404,454 | 4/1995 | Parks | 395/841 |
| 5,418,909 | 5/1995 | Jackowski et al. | 395/275 |
| 5,438,665 | 8/1995 | Taniai et al. | 395/845 |
| 5,551,006 | 8/1996 | Kulkarni | 711/146 |
| 5,574,944 | 11/1996 | Stager | 395/825 |
| 5,655,151 | 8/1997 | Bowes et al. | 395/842 |
| 5,671,439 | 9/1997 | Klein et al. | 395/821 |

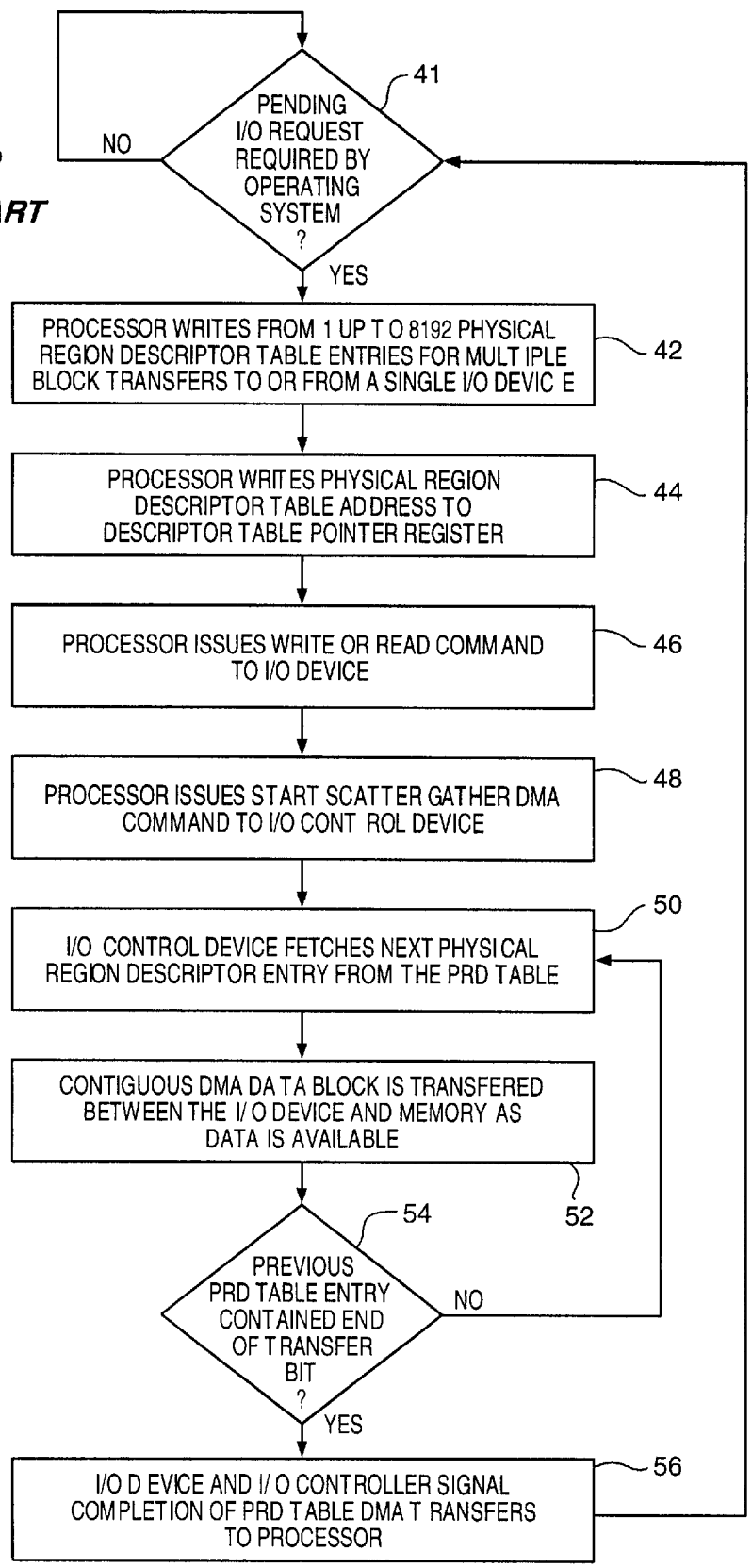

METHOD AND APPARATUS FOR CONTROLLING (N+I) I/O CHANNELS WITH (N) DATA MANAGERS IN A HOMOGENOUS SOFTWARE PROGRAMMABLE ENVIRONMENT

This is a continuation of application Ser. No. 08/488,427 filed Jun. 7, 1995, now abandoned, that is a continuation-in-part of application Ser. No. 08/407,439 filed Mar. 17, 1995, abandoned.

BACKGROUND OF THE INVENTION

1. Field of the Invention

This invention relates to computer system input output (I/O) operations, and more particularly to an apparatus and method for improving I/O performance of a multiple I/O channel computer system at minimal cost. This invention is intended for use in computer systems controlled by a multiple tasking, multiple threaded operating system such as Windows NT, OS/2, System 7.5, Novell or UNIX, but could also provide significant cost advantages in computer systems controlled by single threaded and/or single tasking operating systems such as Windows or DOS.

2. Description of Related Art

A typical computer system generally includes one or more central processing units (CPUs), main memory and one or more I/O channels. The functions of the I/O channels are to transfer data between the CPU's main memory and input or output peripheral devices such as storage units or network interface devices. Storage units store data and programs which the CPU uses in performing specific programming tasks. Typical storage units include hard disk drives, CDROMs and tape drives. Network interface devices allow the transfer of data to or from other computer systems on the network. Typical network interfaces include Ethernet, fiber channel, ATM and FDDI.

In a simple, low performance architecture, the CPU exchanges data between the main memory and the I/O channels by programmed I/O instructions. Each unit of information (byte, word, etc.) is retrieved from the main memory by the CPU and transferred to the I/O channel by the CPU (or vice versa to transfer data in the opposite direction). As CPU performance rapidly increased, the power of the CPU chip dramatically outpaced the capacity of even the fastest I/O channels and peripheral devices to consume or produce data. Utilizing a high performance CPU for lower speed I/O tasks was found to be wasteful of the valuable CPU processing power. A high performance CPU spent much of its time waiting for an I/O device or processing interrupts to service low speed I/O channels. To reduce this I/O servicing time load on a powerful CPU, Direct Memory Access (DMA) techniques evolved in which the I/O channel includes sufficient processing power, independent of the CPU, to directly manipulate data in the main memory of the computing system, devoid of CPU intervention for lengthy periods of time. DMA techniques free the CPU power for computational functions rather than simply exchanging data with significantly slower I/O channels and peripheral devices.

As the CPU processing power has increased, application programs have evolved which require significantly higher I/O bandwidth between peripheral devices and the main memory. For example, the generation of real-time, full motion video may require retrieval of large volumes of data from a mass storage device over an extended period of time. During this extended period of time the I/O channel electronics associated with the mass storage transfer is dedicated to a single transfer function and therefore unusable for initiating other I/O operations. Typically, full motion video windows are limited in size to a fraction of the video monitor size due, in part, to limitations in I/O peripheral device bandwidth. In a single-user, single-threaded operating system environment (such as MSDOS) it may be acceptable for an I/O channel to be dedicated to a single I/O request for an extended period of time. A single-threaded, single-user system may not require the initiation of other I/O operations during this extended period of time. However, users operating computer systems in multi-window, multi-tasking, graphics intensive environments expect essentially instantaneous response from the computer system as they enter commands or "click" icons. Users perceive that mouse clicks on an icon representing a large text file or application should result in immediate visual results, whether or not the selected file resides on a peripheral device currently busy servicing other I/O requests and regardless of the busy status of an I/O channel (for example in use for an extended period of time transferring large blocks of full motion video data).

This "instant response" expectation, when coupled with the high-bandwidth transfer requirement, dictates that I/O controllers allow I/O requests to be preempted and rescheduled at a later time. Toward this end, many techniques commonly referred to as "scatter/gather" methods are applied to partition lengthy I/O requests into smaller segments which the I/O channel DMA circuits may manipulate. Among other benefits, the scatter/gather approaches known in the art permit the I/O channel to be more easily preempted at the boundaries between the smaller segments of large I/O requests. The I/O channel is typically provided with a data structure (referred to herein as Physical Region Descriptor Tables or simply PRD tables) in main memory which identifies a list of segments to be exchanged between the I/O peripheral device and main memory. The data management component (DMA) of the I/O channel reads information from the PRD table entries to determine the size and locations of segments to be exchanged between the peripheral device and main memory. When the end of the table entries is encountered, the I/O channel signals completion of the I/O request to the CPU and is ready for initiation of another request.

Historically, I/O devices, due to the nature of their technology and their mechanical or network delays, are able to sustain data transfers at only $\frac{1}{16}$ to $\frac{1}{2}$ of the I/O bus bandwidth. Most I/O devices contain buffer memories (typically 32 Kb to 256 Kb in size) to compensate for their low media or network bandwidths. The buffer is used to adapt the interface speed of the slower peripheral I/O device to the faster speed of the main memory DMA interface. The buffer is filled from main memory at a high speed then transmitted to the peripheral I/O device at a slower speed. Conversely, when reading information, the buffer is filled at a slower speed when reading information from a peripheral device, then emptied at a faster speed when transmitting the read information to the main memory (via DMA). Thus, once the slow media rate has partially filled the devices buffer memory, I/O bus transfers may progress at data rates dictated by the faster bus bandwidth rather than rates dictated by the slower media or network performance. However, once the buffer space has been exhausted due to a transfer which is larger than the buffer size, transfer bandwidth reverts back to the media or network bandwidth.

One approach to improving the overall performance of I/O bandwidth is typified by Enhanced Integrated Drive Electronic (EIDE) disk drives having larger buffers than typical IDE interfaces. With a larger buffer, the EIDE channel is capable of exchanging information at over sixteen megabytes per second. Brad Hosler has proposed an IDE interface specification for improving system performance in multi-tasking environments, called "A Programming Interface for Bus Master IDE Controllers", which assumes the capabilities inherent in the DMA capable IDE disk drives mentioned earlier. Hosler's proposal, which is hereby incorporated by reference as background material, specifies a simple scatter/gather mechanism which allows large or small blocks of I/O transfer data to be scattered to or gathered from main memory. This mechanism cuts down on the number of processor interrupts required and the total number of I/O device interactions with the CPU when transferring large blocks of data, such as that required to support full motion video. Although the scatter/gather programming interface specifications were originally intended specifically for controlling hard disk drives on an IDE channel, the proposed software standards may be readily adapted to access other types of storage devices on the IDE channel, storage devices on other types of I/O channels or network interface devices using the same homogeneous scatter/gather programming interface.

FIGS. 1 and 2, discussed in detail below, depict the architecture and methods typical in prior I/O channel designs. Where a single data management component (DMA circuits of an I/O channel) is associated with the control of the peripheral I/O device. FIGS. 3A and 3B, discussed in detail below, graphically depict the utilization of the I/O channel circuits. FIGS. 3A and 3B graphically show the use of the buffer associated with each I/O device. The buffers associated with "channel 0 device" and with "channel 1 device" are each filled by the device at a slower pace than they are emptied by "channel 0 bus operation" and "channel 1 bus operation", respectively. In FIG. 3B, a single data management component (DMA) is utilized to exchange data with two I/O peripheral devices. As can be seen in FIG. 3B the total time for exchanging data with both devices is essentially equal to twice the time required for a single device. This is due to the fact that the single DMA circuit must be applied to the two I/O devices sequentially. That is, data relating to the second I/O peripheral device remains pending in the buffer associated with the device until the DMA (data management component) has completed operations involving the first device.

Obviously this limitation on I/O channel performance may be resolved by the addition of I/O channel circuits which may be associated with different peripheral I/O devices in parallel with the operation of the first I/O channel. As shown in FIG. 3A, the addition of a second I/O channel data management component (DMA) permits the second operation to overlap with the first. However, such a simplistic solution adds complexity and hence cost by duplicating portions of the I/O channel circuitry which are underutilized. It can also be seen in FIG. 3A, that there remains a significant portion of "idle" time for the DMA circuits while the buffer associated with each I/O device is refilled. Therefore, addition of I/O channel DMA components provides a simplistic solution to improve the overall throughput but is wasteful of the costly, complex electronic circuits.

The larger buffers used in the EIDE standards, even in conjunction with the scatter/gather standards proposed by Mr. Hosler, still do not fully utilize the maximum bandwidth capabilities of the I/O channel's DMA control circuits. Over the extended period of time transferring very large files, even a large buffer will be filled and emptied several times thus leaving the I/O channel circuits less than fully utilized.

From the above discussion, it is evident that a need exists for an improved method and apparatus to increase I/O bandwidth while minimizing the additional costs and complexity associated with the increase.

SUMMARY OF THE INVENTION

The methods and apparatus of the present invention solve the above identified problems, thereby advancing the state of the art, by providing an I/O control device having a data management component (DMA) capable of processing multiple PRD tables, each associated with one of a plurality of I/O peripheral device attached to the I/O control device. In prior approaches, the I/O control device provide a single I/O channel (a connection between the CPU, main memory, and the I/O peripheral device). The present invention provides an I/O control device which provides for overlapping operation of a plurality of I/O peripheral devices: in essence a plurality of I/O channels within a single I/O device. The I/O control device of the present invention includes a plurality of I/O interface circuits to adapt to a plurality of I/O peripheral devices. Other circuits in the I/O control device are shared as common circuitry for purposes of interfacing the plurality of I/O interface circuits to the CPU and main memory through an enhanced data management circuit (DMA). Methods of the present invention utilize the I/O control device such that when the data management component empties the buffer associated with one peripheral device, a filled buffer associated with another device and another PRD table may be processed. In this manner, the I/O control device may be utilized near its maximum bandwidth. In addition, the duplication of common circuits for CPU and main memory communication is minimized as compared to a simplistic solution which merely duplicates the entirety of the I/O channel circuit.

The apparatus previously described in FIG. 1 is extended by the present invention to allow multiple I/O channel bus master scatter/gather operations. Additional Physical Region Descriptor (PRD) tables are used by the I/O control device of the present invention, one for each I/O peripheral device to be managed by the I/O control device. The plurality of I/O peripheral devices interfaced through the I/O control device may be a heterogenous mixture of device types regardless of each device's protocol and function, so long as the I/O channel and it's associated I/O devices are capable of DMA transfers. For example, one I/O control device may be attached to one or more networking devices, one or more high speed mass storage devices (disks, fiber channels, etc.), and one or more low speed mass storage devices (tapes, CDROMS, network devices, etc.). The PRD table for each I/O channel used in the I/O control device may be constructed optimally for the particular device type. Slower devices may be utilized with a PRD table which segments a large data transfer into a large number of small segments while faster devices may be utilized with a PRD table which segments a large transfer into a smaller number of large segments. The aggregate bandwidth of the I/O subsystems connected through the I/O control device of the present invention is increased by tuning the PRD table entries appropriately for the performance characteristics of each device attached through the I/O control device.

Furthermore, additional data management circuits (DMA) may exist within the I/O control circuit. Each DMA may control one or more I/O devices attached to the I/O control device and each device associated with a PRD table. Prior art implementations for performing these data transfers typically dedicate a single data manager to each I/O channel because the methods used to control the data managers are not successful in maintaining maximum possible I/O bandwidth between the I/O devices and main memory. Dedicating a single DMA to each I/O channel required the duplication of others circuits in the I/O channel used for CPU and main memory interfering. The present invention rather modifies the data management circuits (DMA) portion of the I/O control device to control a plurality of I/O devices while sharing the common circuitry for CPU and main memory interfacing.

The present invention provides an apparatus and method for improving the input/output performance of a computer system under the control of a multi-tasking, multi-threaded operating system while reducing the complexity and costs associated with prior designs. In particular, the invention provides an apparatus and method to chain contiguous DMA scatter/gather sub blocks of a PRD table for channel 0 with contiguous DMA scatter/gather sub blocks of a PRD table for channel 1, using a single data manager, while maintaining maximum media bandwidth. DMA block transfers are scheduled based on the availability of data from the I/O device's buffer memory, thus minimizing both media or network idle time as well as minimizing I/O bus idle time. Near maximum aggregate bandwidth of multiple I/O buses and their associated devices is obtained. The apparatus and method thus provides significant performance advantages over prior techniques having two I/O channel systems implemented with a single data manager. The apparatus and method further provides a means for preempting outstanding and in-progress DMA requests to an I/O device on a given I/O channel when a higher priority request is encountered for a device on the same channel or for the same device. The invention can be easily extended to control "n+i" I/O channels using "n" data managers. The apparatus provides a performance efficient method for software drivers to make use of preemptive scheduling techniques found in newer multi-tasking, multi-threaded operating systems. Preemptive support lessens the response time of performance critical I/O requests.

It is therefore an object of the present invention to provide an improved data processing system.

It is another object of the present invention to provide an improved I/O operation in a data processing system.

It is yet another object to the present invention to provide improved DMA operations in a data processing system.

It is still another object of the present invention to provide improved DMA performance, at minimal incremental cost, in a data processing system.

It is a further object of the present invention to provide improved I/O operation in a multi-tasking, multi-threaded data processing system.

The details of the preferred embodiment of the present invention are set forth in the accompanying drawings and in the description which follows.

BRIEF DESCRIPTION OF THE DRAWINGS

FIG. 2 is a diagram of a prior method or flow chart for performing bus master scatter/gather DMA operations;

DETAILED DESCRIPTION OF THE PREFERRED EMBODIMENT

Description of Prior Apparatus Design and Applicable Methods

To better understand the present invention, it is useful to understand a model of the prior designs. FIGS. 1, 2, 3A, and 3B depict the apparatus, methods, and problems of typical prior bus master I/O channel designs.

Figure 1:
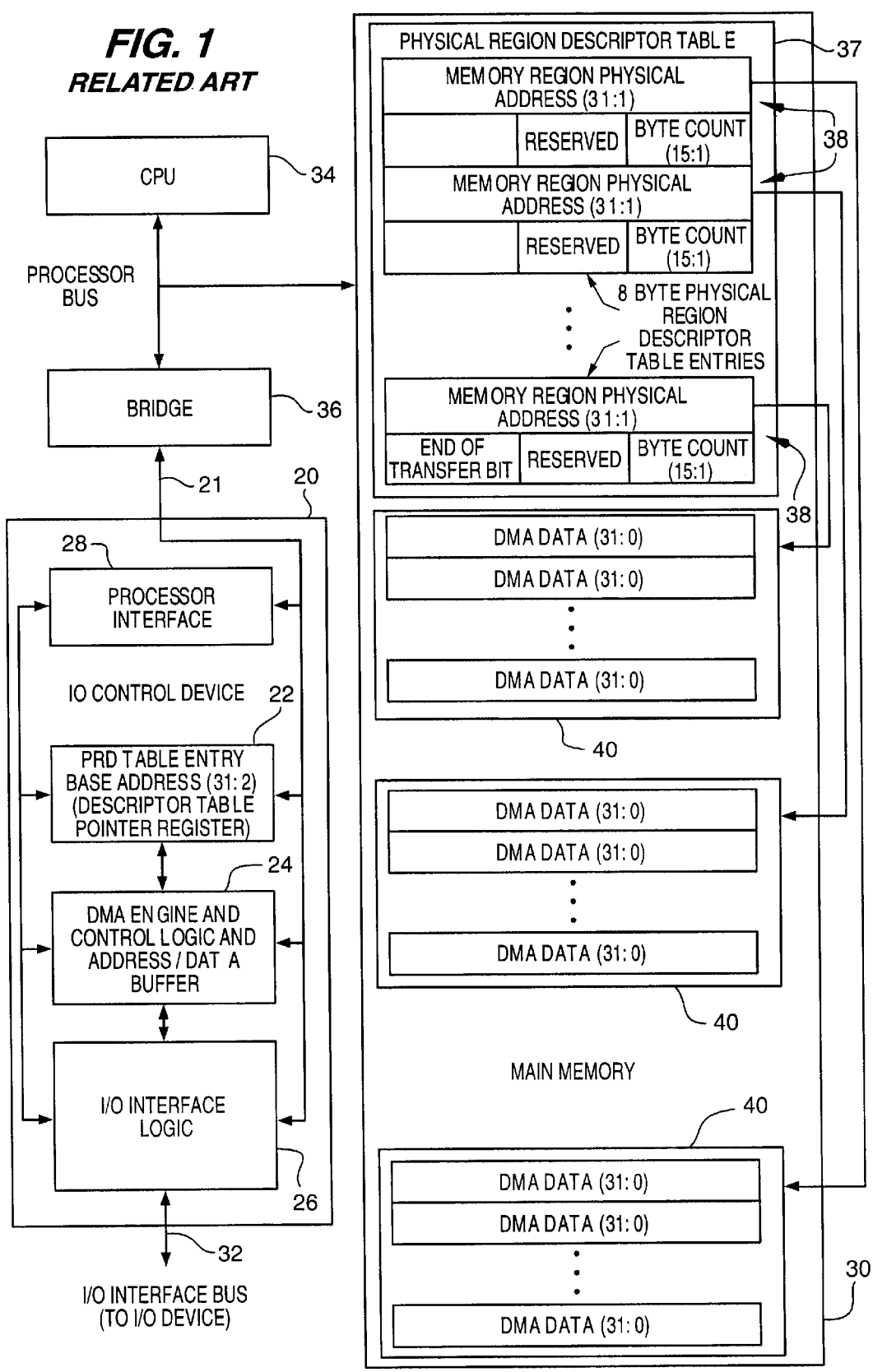
FIG. 1 is a diagram of a prior mechanism for performing bus master scatter/gather DMA operations.

FIG. 1 shows an apparatus according to prior designs used to perform bus master scatter/gather DMA operations. The I/O control device 20 contains one descriptor table pointer register 22, a data manager 24, an I/O interface 26 and a CPU interface 28. Data manager 24 contains a single dedicated DMA engine for managing bus master data transfers between the I/O device (not shown) and main memory 30. Bus master data transfers, once initiated, are performed without the need for intervention by CPU 34. Buffer memory (not shown) is usually associated with the I/O device to permit high speed burst transfers between the main memory 30 and the I/O device buffer memory. Buffer memory within the I/O device is well known in the art. This helps maintain maximum data transfer bandwidth between the I/O channel or interface bus 32 and the processor interface 28 during buffer size bursts of data transfer. The I/O control device 20 (also known as an I/O controller) connects to the CPU 34 and main memory 30 through a bridge 36, via interface 21. The bridge 36 may simply provide an extension of the processor's bus, or may buffer and extend the processor bus using an entirely different bus structure and protocol such as PCI. These types of bridges are commonly known in the art.

Besides containing CPU program and data storage, main memory 30 contains a physical region descriptor (PRD) table 37 associated with the I/O control device 20 and having PRD entries 38. Main memory 30 also provides blocks of memory 40 for storage of data to be exchanged with the I/O devices through the I/O control device 20 and interface bus 32. Each PRD entry 38 in the PRD table 37 specifies an address for a memory block 40 and a size of the data to be exchanged with the I/O device using the specified memory block 40.

As depicted in FIG. 1, the I/O control device 20 shows the data manager 24 associated with a single I/O device. The I/O control device 20 may also be configured to associate the data manager with one of a plurality of devices. However, since the data manager 24 is designed to operate on a single PRD table 37, the bandwidth of the data exchange operation is limited to that of each device. The data manager 24 is fixed in its association with a single I/O device until all the data transfer requests in the PRD table entries 38 are completed. Only then may the data manager 24 be associated with another device to initiate and complete a data exchange with a new I/O device.

FIG. 2 is a flowchart which describes methods used within I/O control device 20 of FIG. 1 to perform data transfers in conjunction with operation of CPU 34 of FIG. 1. The elements of FIG. 2 depict elements 41–48 operable within CPU 34 of FIG. 1. Elements 50–56 are operable within I/O control device 20 in response to operation of elements 41–48 in CPU 34.

Element 41 is operable within CPU 34 to await a request to initiate I/O to a desired I/O device. When a request from the operating system software is received, processing continues with element 42, operable within CPU 34, to write the PRD table entries for the multiple block transfers which comprise the requested I/O data transfer. The PRD table comprises from 1 to 8192 PRD table entries describing the exchange of data with a single I/O device.

Element 44 is then operable within CPU 34 to write the starting address in main memory 30 of the PRD table constructed by element 42 into the descriptor table pointer register 22 within I/O control device 20. I/O control device 20 uses the address of the PRD table when accessing PRD entries to perform the requested data exchange with the desired I/O device. Elements 46 and 48 are next operable within CPU 34 to initiate the I/O operation within I/O control device 20. In element 46, CPU 34 directs I/O to perform either a read operation or a write operation with the selected I/O device. In element 48, CPU 34 issues a start DMA command to I/O control device 20. Responsive to operation of element 48, I/O control device 20 initiates and completes the exchange of data described by the entries of the PRD table preset by operation of CPU 34 through elements 41–48. Following operation of element 48 within CPU 34, further I/O request processing within CPU 34 awaits the completion of the I/O request by operation of I/O control device 20 as discussed below with respect to elements 50–56.

Elements 50–56 are operable within I/O control device 20 to perform the I/O data exchange between the selected I/O device and name memory 30. The data exchange to be performed is described by the PRD table preset by operation of elements 42–48 in CPU 34 as described above. Further I/O request processing within CPU 34 will await completion of the I/O request processing by elements 50–56 within I/O control device 20.

Element 50 is operable within I/O control device 20 to fetch the next PRD table entry from the PRD table pointed to by the descriptor table pointer register 22. The descriptor table pointer register 22 was initialized to the starting address of the PRD table by operation of element 44 in CPU 34 as described above. Element 52 is next operable within I/O control device 20 to perform the requested data exchange of a contiguous data block between the selected I/O device and main memory 30. The address is main memory 30, and the length of the data transfer to be performed, are encoded within the PRD table entry fetched by operation of element 50. The data exchange operation of element 52 is performed within I/O control device 20 by moving data between main memory 30 and the buffer associated with the selected I/O device. The data is exchanged by data manager 24 interfacing to the selected I/O device through I/O interface logic 26 and bus 32. Data manager 24 also exchanges information with main memory 30 via bus 21 and bridge 36. The exchange is controlled without the need for intervention by CPU 34. Operation of element 52 within I/O control 20 completes the transfer of a single contiguous data block between the selected I/O device and main memory 30. Processing then continues with element 54 to determine whether the PRD table entry has its end of transfer flag bit set. If the end of transfer flag bit is not set, processing continues by looping back to element 50 to fetch the next PRD table entry and exchange the contiguous data block defined therein. If the current PRD table entry has the end of transfer flag bit set, processing continues with element 56. Element 56 is operable to signify the completion of the I/O request defined by the PRD table. I/O control device 20 signals CPU 34 that the requested I/O data exchange has been completed, and the method continues by returning to element 41 to await a new I/O request. The I/O controller is now usable for the next bus master DMA operation.

As can be seen from the above description of prior methods, the I/O control device 20 may be busy waiting for the I/O device to be ready to transfer data at operation of element 46. The data exchange will occur quickly when the buffer memory associated with the I/O device is ready to receive data (in a write operation) or filled with data retrieved from the I/O device (in a read operation). However, when the I/O device is filling or emptying its buffer memory, the I/O control device is busy though idle as no data is exchanged with main memory 30 over bus 21 via bridge 36.

Figure 3A:
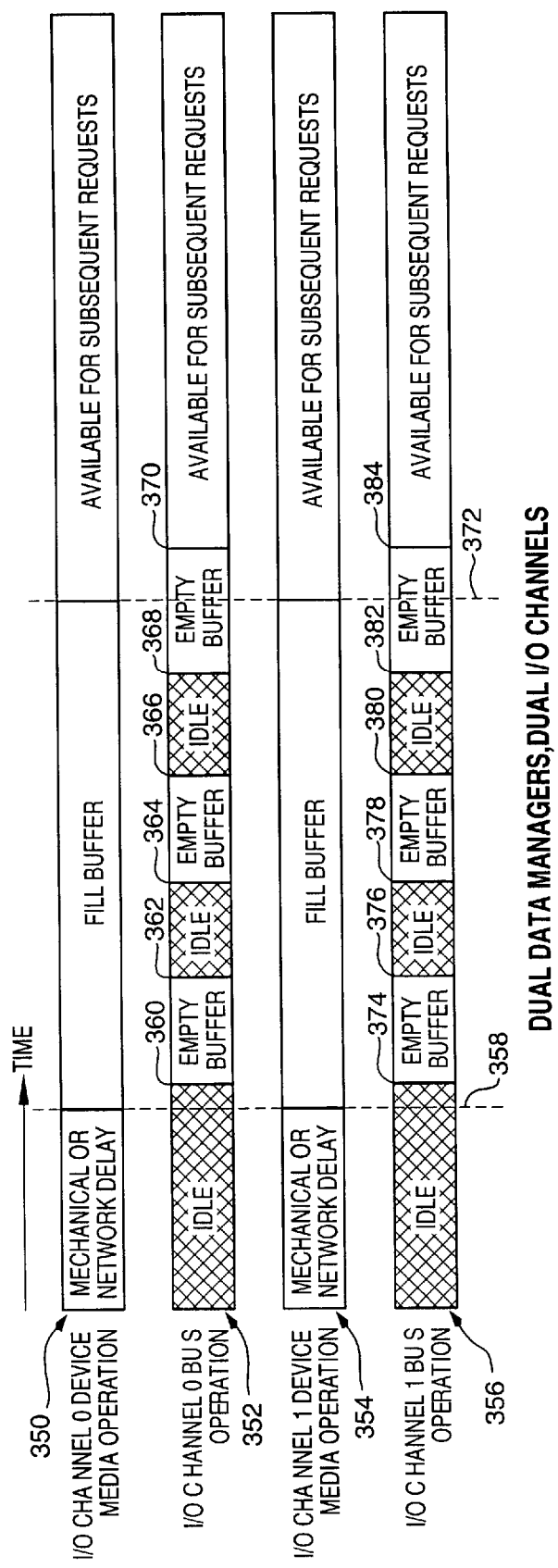
FIGS. 3A and 3B contain performance analysis diagrams for single and dual data manager, dual I/O channel operations.
Figure 3B:
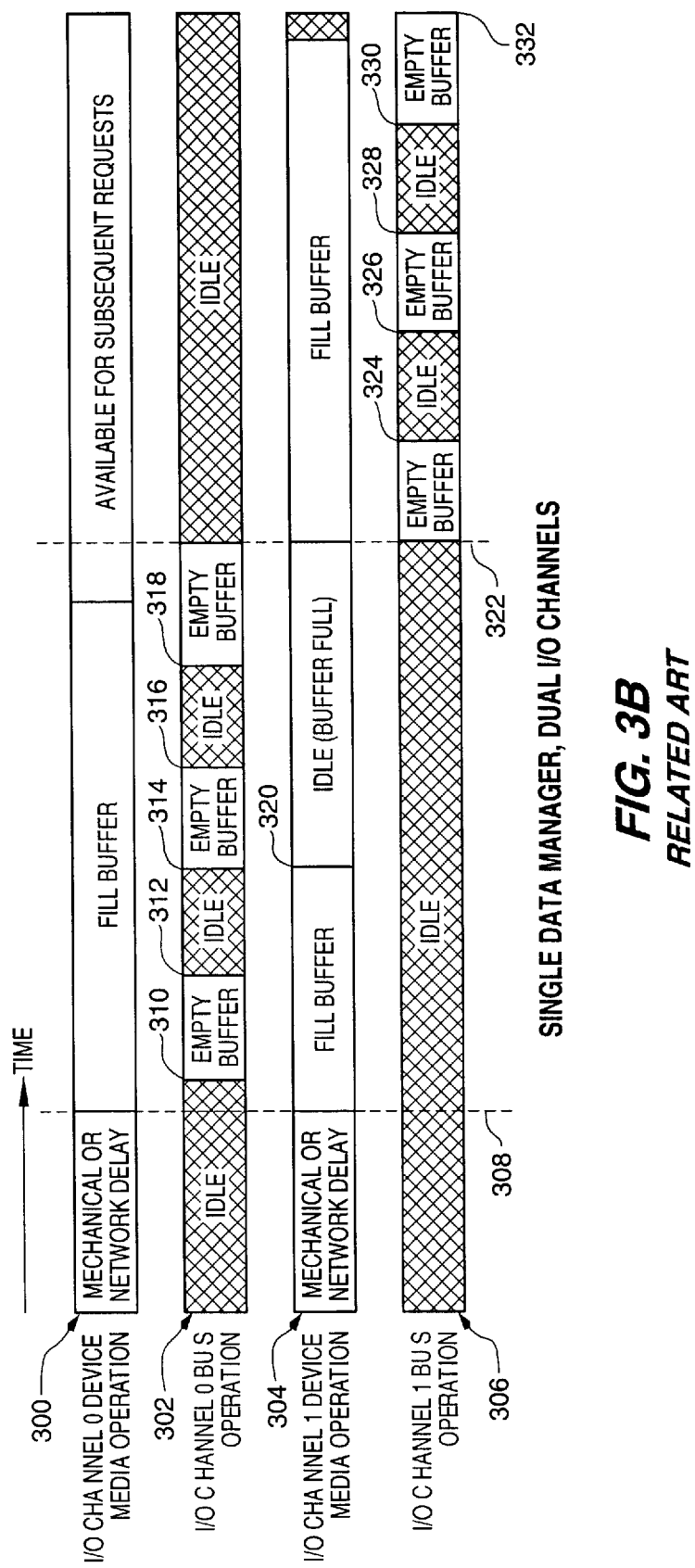

FIG. 3B depicts typical utilization over time of a single data manager used in accord with the prior approaches described above with reference to FIGS. 1 and 2. In these prior approaches, a single data manager may be utilized to exchange data with multiple I/O devices. However, the exchange is performed sequentially in that a data transfer with a first I/O device is completed before a data transfer with a second I/O device is initiated. In FIG. 3B, four time lines are depicted to describe the operation of two I/O devices managed by a single data manager. The operation of the single data manager exchanging data over bus 21 with main memory 30 is indicated by two time lines, namely, 302 and 306. The operation of each I/O device or channel is indicated by time line 300, and 304, respectively. As depicted in FIG. 3B, time proceeds from left to right. Points of time along the horizontal time axis are referenced by vertical lines labeled 308–332.

Two devices, namely channel 0 device depicted by time line 300, and channel 1 device depicted by time line 304, are both ready to exchange data with main memory at time reference 308 following an initial delay for network or mechanical initiation of communications. At time reference 308, both devices begin filling their respective buffers. The corresponding operation of the single data manager exchanging data over bus 21 with main memory 30 is indicated in time lines 302 and 306. At time reference 310, the single data manager is operating in conjunction with channel 0 device to empty the partially filled buffer associated with the device. At time reference 312, the single data manager has completed emptying the buffer associated with channel 0 device and remains idle until the buffer is filled with additional data by continued operation of channel 0 device. The single data manager remains busy associated with operation of channel 0 device as indicated by time line 302. At time reference 314, the single data manager again empties the data buffer until time reference 316 at which the data buffer is emptied and the data manager goes idle awaiting further data from channel 0 device. The sequence continues wherein the data manager is idle from time reference 316 to time reference 318 and finally empties the buffer from time reference 318 to time reference 322. At time reference 322, the data manager has completed the association with channel 0 device and is available to operate in conjunction with channel 1 device.

While the single data manager is operating in conjunction with channel 0 device, channel 1 device, shown in time line 304, started filling its buffer at time reference 308 and filled the buffer at time reference 320. Channel 1 device then becomes idle, awaiting emptying of its buffer by the data manager. At time reference 322, as shown on time lines 302 and 306, the data manager has completed its operation in association with channel 0 device. Similar to the description above with reference to time line 302, the single data manager completes empties the device buffer from time reference 322 through time reference 324. As the buffer is emptying, channel 1 device may continue filling its buffer. The data manager then continues its sequence as depicted in time line 306 and as described above with reference to time line 302. The data manager is idle from time reference 324 to time reference 326, empties the buffer from time reference 326 to time reference 328, is idle again from time reference 328 to time reference 330, and finally completes emptying of the buffer from time reference 300 through time reference 332.

It can be seen from FIG. 3B that the single data manager is substantially underutilized in that there are significant periods of idle time awaiting the refilling of the device buffer by the channel device with which the single data manager is currently associated. For example, in FIG. 3B, the single data manager is idle approximately 50% of the time beginning at time reference 312 and ending at time reference 332. This significant idle time in the I/O channel while channel device 1 is ready to exchange data reduces the overall I/O throughput of the data processing system. A common approach to resolve the problem of improved I/O throughput in prior approaches, is exhibited in FIG. 3A, wherein a plurality of data data managers are utilized, one associated with each of a plurality of I/O devices.

As in FIG. 3B, FIG. 3A shows four time lines, one for each of two channel devices, and one for each of two data managers. Time line 350 indicates the operation over time of a first channel device. Time line 354 indicates the operation over time of a second channel device. Time line 352 indicates the operation over time of a first data manager associated with the first channel device. Time line 356 indicates the operation over time of a second data manager associated with the second channel device. In this I/O configuration of FIG. 3A, each I/O channel device and data manager operates independently of the other. The first data manager, indicated by time line 352, operates similarly to the data manager shown in FIG. 3B. Specifically, the first data manager empties the buffer of channel 0 device in time periods 360–362, 364–366, and 368–370 and is idle awaiting further data from the device during time periods 362–364 and 366–368. The second data manager, indicated by time line 356 of FIG. 3A, operates independent of, and in parallel with, the first data manager, indicated by time line 352. Specifically, the second data manager empties the buffer of channel 1 device during time periods 374–376, 378–380 and 382–384 and is idle awaiting further data from the device during time periods 376–378 and 380–382.

Although the solution as depicted in FIG. 3A provides overall improvements in I/O throughput of the data processing system, there is additional complexity and associated costs incurred with duplication of the data manager circuitry. Each of the two data managers as shown in FIG. 3A is utilized approximately 50% of the time, as depicted by time lines 352 and 356. Specifically, the first data manager is idle during time periods 362–364 and 366–368, while the second data manager, operating in parallel with the first, is idle during time periods 376–378, and 380–382.

Description of the Preferred Apparatus

Figure 4:
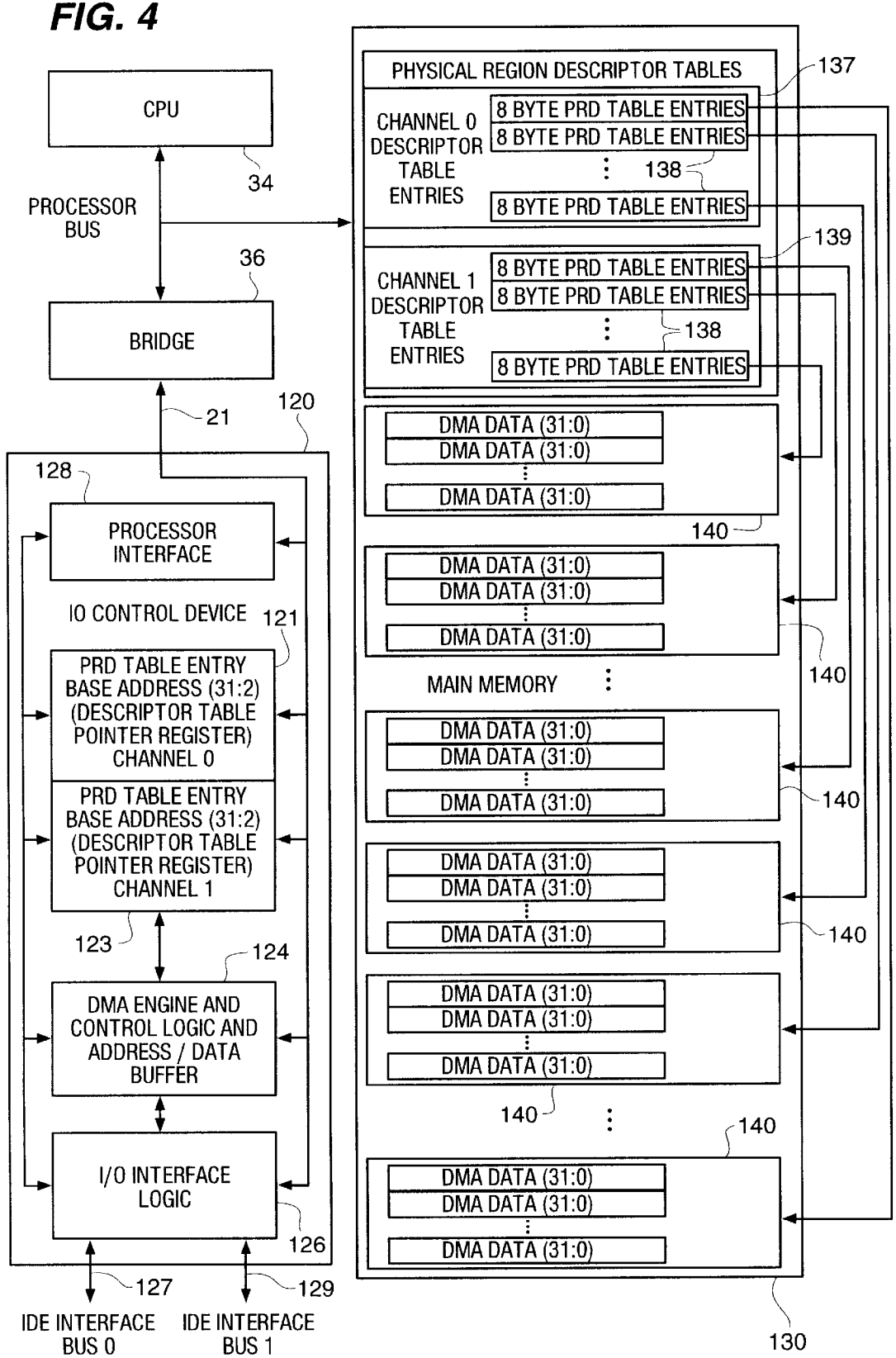
FIG. 4 is a diagram of the mechanism for performing single data manager controlled bus master scatter/gather DMA operations in a two I/O channel system.

FIG. 4 shows an apparatus according to the present invention used to perform bus master scatter/gather DMA operations. The I/O control device 120 contains two descriptor table pointer registers 121 and 123, a data manager 124, an I/O interface 126 and a CPU interface 128. Data manager 124 contains a single DMA engine for managing bus master data transfers between the I/O devices (not shown) and main memory 130. Unlike prior designs, the data manager 124 is adapted to interleave data exchanges from either of two (or more) I/O devices based on the availability of data for exchange between the I/O device and the main memory 130.

Bus master data transfers, once initiated, are performed without the need for intervention by CPU 34. Buffer memory (not shown) is usually associated with the I/O devices to permit high speed burst transfers between the main memory 130 and the I/O device buffer memories. Use of buffer memory within the I/O devices is well known in the art. This helps maintain maximum data transfer bandwidth between the I/O channel or interface buses 127, 129 and the processor interface 128 during buffer size bursts of data transfer. I/O control device 120 connects to the CPU 34 and main memory 130 through a bridge 36, via interface 21. The bridge 36 may simply provide an extension of the processor's bus, or may buffer and extend the processor bus using an entirely different bus structure and protocol such as PCI. These types of bridges are commonly known in the art.

Besides containing CPU program and data storage, main memory 130 contains two physical region descriptor (PRD) tables 137 and 139 associated with the I/O control device 120 and each having one or more PRD entries 138. Each PRD table is associated with a particular I/O device and is constructed in main memory 130 by CPU 34 before initiating an I/O request to the I/O control device 120. A PRD table (137 or 139) is associated with a particular I/O device by CPU 34 writing the starting address in main memory 130 of the PRD table in the descriptor table pointer register (121 or 123) corresponding to the desired I/O device, channel 0 device or channel 1 device, respectively. Main memory 130 also provides blocks of memory 140 for storage of data to be exchanged with the I/O devices through the I/O control device 120 and interface buses 127 and 129. Each PRD entry 138 in the PRD tables 137 and 139 specifies an address for a memory block 140 and a size of the data to be exchanged with the I/O device using the specified memory block 140.

As depicted in FIG. 4, the I/O control device 120 shows the data manager 124 associated with two I/O devices and a corresponding two descriptor table pointer registers 121 and 123. The I/O control device 120 may also be configured to associate the data manager with "n" descriptor table pointer registers and "n+i" I/O devices. As will be seen in the discussion below, the methods of the present invention utilize the data manager to the fullest extent possible by processing N PRD tables (for example 137 and 139) to exchange data between any of "n+i" I/O devices and main memory 130.

As discussed in detail below, the methods of the present invention "swap" the data manager 124 between multiple PRD tables (for example, 137 and 139) to maintain full utilization of the bandwidth of the I/O data transfers between I/O devices and main memory 140. As the data manager 124 completes processing of each entry in a PRD table (for example, 137) associated with a first I/O device, the data manager will "swap" to the second PRD table (for example, 139), associated with a second I/O device, while it awaits the re-filling of the first device's buffer. Conversely, the data manager will "swap" to the first PRD table (for example, 137), associated with the first I/O device, while it awaits the re-filling of the second device's buffer. One of ordinary skill in the art will readily recognize that this method of the present invention may be extended to a more general case of a data manager 124 managing "n" PRD tables corresponding to CPU I/O requests and applying the requests to "n+i" I/O devices to exchange data between a requested one of the "n+i" devices and the main memory 130.

Description of Preferred Method

Figure 5A:
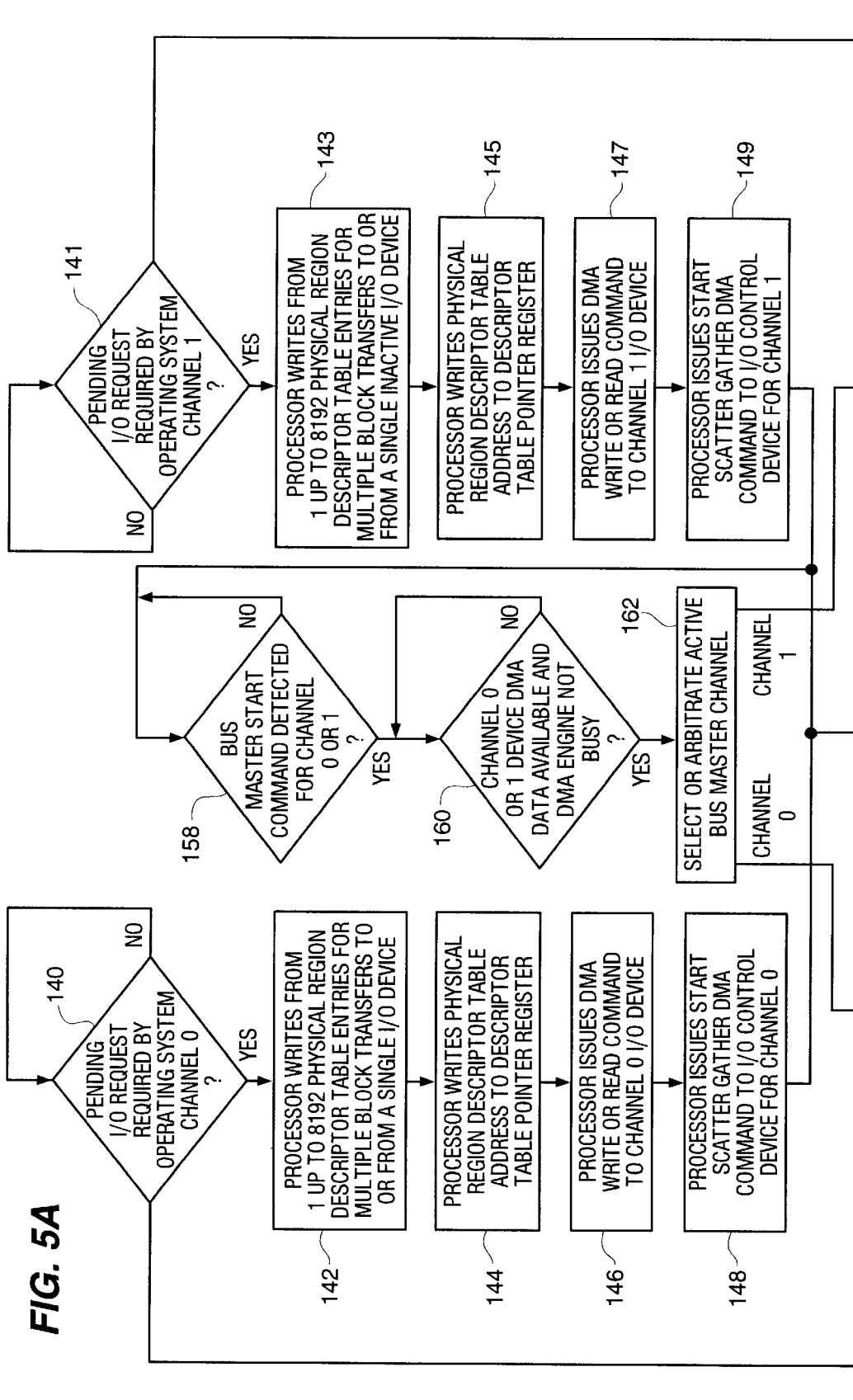
FIG. 5 is a diagram of the method for performing single data manager controlled bus master scatter/gather DMA operations in a two I/O channel system.
Figure 5B:
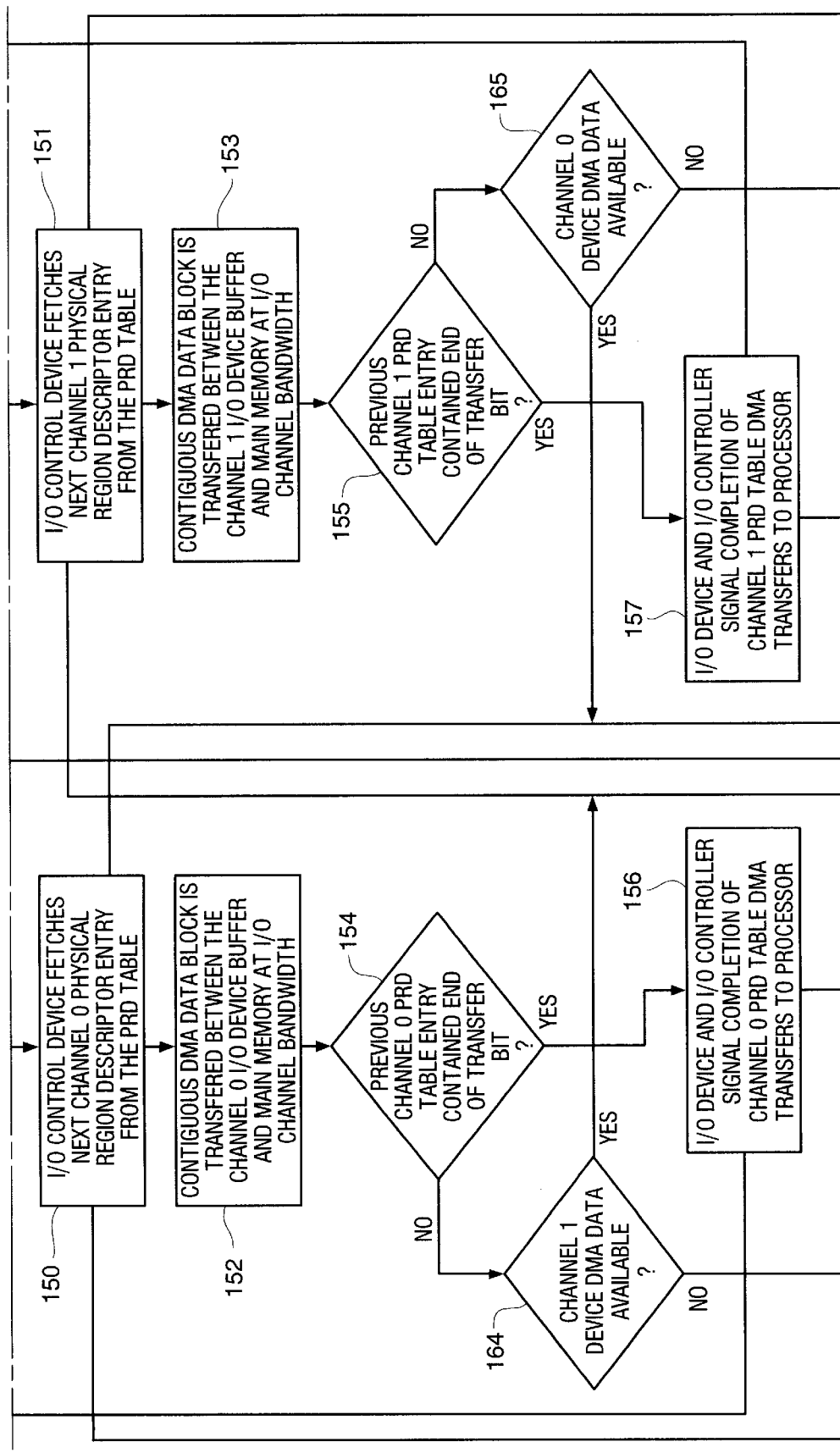
Figure 5C:
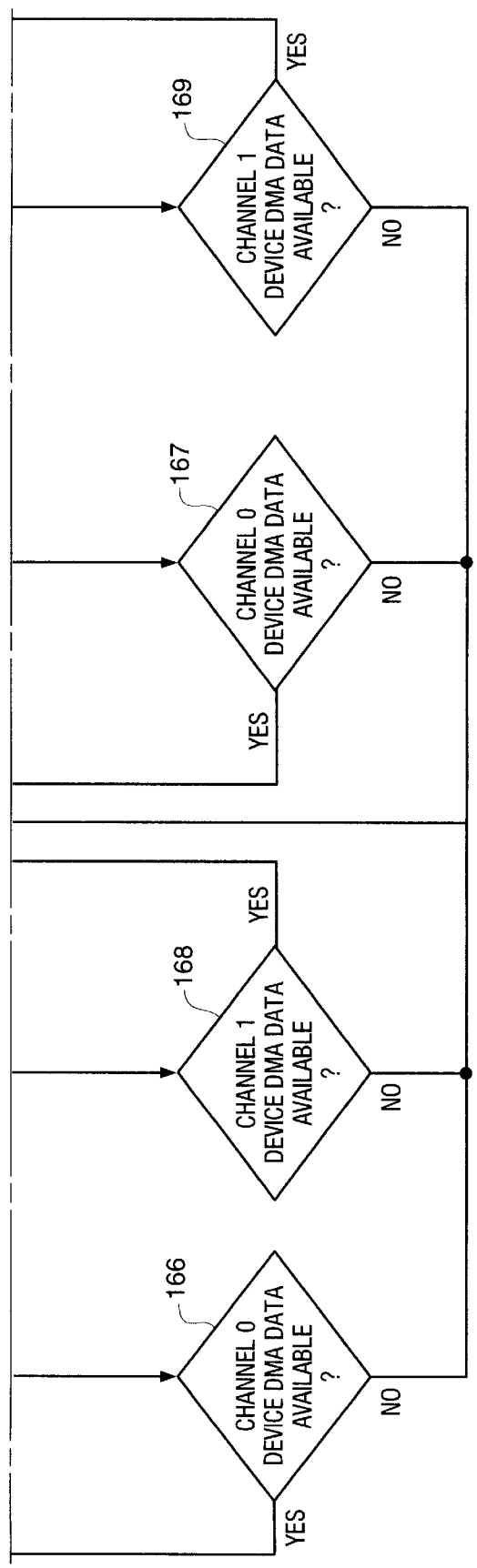

FIG. 5 shows the preferred method of the present invention operable within I/O control device 120 of FIG. 4 used for performing I/O operations on two I/O devices, each associated with one of two PRD tables (137 and 139) in main memory 130. Elements 140, 142, 144, 146, and 148 are operable within CPU 34 to initiate an I/O request on channel device 0 and are substantially identical to the operation of elements 41, 42, 44, 46, and 48, respectively, as described above with respect to FIG. 2. These elements are representative of a first task operable within CPU 34 to initiate I/O requests to I/O channel device 0. Elements 141, 143, 145, 147, and 149 are operable in CPU 34 similarly to the operation of elements 140, 142, 144, 146, and 148, respectively, to initiate an I/O request on channel device 1. These elements are representative of a second task operable within CPU 34 to initiate I/O requests to I/O channel device 0. In other words, two parallel tasks (processes) operable within CPU 34 are shown in FIG. 5 to reflect the multi-tasking, multi-threaded operation typical of UNIX and other popular operating system environments. These processes operate asynchronously with respect to one another within CPU 34. Elements operable within I/O control device 120, discussed below, are responsive to the CPU processing elements to perform the necessary data transfers corresponding to the I/O requests.

Element 140 (or 141 for I/O device 1) is operable within CPU 34 to await a request to initiate I/O on I/O device 0 (or I/O device 1). When a request from the operating system software is received, processing continues with element 142 (or 143 for a request to I/O device 1), operable within CPU 34, to write the PRD table entries for the multiple block transfers which comprise the requested I/O data transfer. The PRD table comprises from 1 to 8192 PRD table entries describing the exchange of data with a single I/O device.

Element 144 (or 145 for a request to I/O device 1) is then operable within CPU 34 to write the starting address in main memory 130 of the PRD table constructed by element 142 (or 143) into the descriptor table pointer register 121 (or 123) within I/O control device 120. I/O control device 120 uses the address of the PRD table when accessing PRD entries to perform the requested data exchange with the desired I/O device. Elements 146 and 148 (or 147 and 149 for a request to I/O device 1) are next operable within CPU 34 to initiate the I/O operation within I/O control device 120. In element 146 (or 147), CPU 34 directs I/O control device 120 to perform either a read operation or a write operation with the selected I/O device. In element 148 (or 149), CPU 34 issues a start DMA command to I/O control device 120. Responsive to operation of element 148 (or 149), I/O control device 120 initiates and completes the exchange of data described by the entries of the PRD table preset by operation of CPU 34 through elements 140–149. Further I/O request processing within CPU 34 for I/O channel device 0 (or for channel device 1) awaits completion of the I/O request by processing within I/O control device 120 (elements 150–169 as discussed below).

As shown in the remaining steps of FIG. 5 (elements 150–169 operable within I/O control device 120), the I/O control device 120 performs a bus master DMA operation on the first contiguous DMA block transfer available from either active I/O device (either device 0 or 1), as specified by the associated PRD table entry for that channel. Following the above contiguous DMA block transfer, the data manager transfers a block from the alternate channel (channel 0 if channel 1 was requested and vice versa) if data is available from the I/O device on that channel. This switch from one channel to another is also referred to herein as a "swap." If data is not available from the alternate channel, and data is available from the original channel, the data manager transfers a block from the original channel. Transfers continue in this manner so long as data is available on one of the two channels, and the current PRD tables have not been exhausted. If neither channel has data available for transfer, the data manager waits for the first available data transfer opportunity. Once data is available from either channel, the alternating channel DMA flow described above is restarted.

The methods operable within I/O control device 120 (elements 150–169 of FIG. 5) await the initiation of an I/O request from CPU 34. Specifically, element 158 of FIG. 5 is operable to await reception of an I/O request initiated by CPU 34. When an I/O request is initiated for either I/O channel device (channel device 0 or 1), element 160 is next operable to determine whether either I/O channel device for which an I/O request has been initiated is ready for data transfer. If an I/O channel device is ready for data transfer, and if the DMA engine (data manager 124 of FIG. 4) is not presently busy transferring a block of data with the other I/O channel device, then another DMA bus master operation is initiated in the data manager 124 of I/O control device 120. Element 162 is operable to select or arbitrate which device will next be used to exchange data. If both I/O channel devices are ready to transfer data, and the DMA engine is not busy, and CPU 34 has initiated an I/O request on both I/O channel devices, then any of several standard selection methods may be used to determine which device will next be used to transfer data. For example, the channels may be prioritized so that channel 0 will always be processed before channel 1. Or, for example, an alternating scheduling approach may be used to ensure fair allocation of bandwidth between the channels. In the case where more than two I/O channels are involved, the alternating scheduling approach may be extended to a "round robin" technique to ensure fair distribution of the available bandwidth to the plurality of channels.

If channel 0 is selected by operation of element 162, elements 150, 152, 154, 156, 164, 166, and 168 are next operable to transfer a contiguous block of data as defined by the next entry in the PRD table associated with the channel. Similarly, if channel 1 is selected by operation of element 162, elements 151, 153, 155, 157, 165, 167, and 169 are next operable to transfer a contiguous block of data as defined by the next entry in the PRD table associated with the channel.

In response to selection of channel 0 by operation of element 162, element 150 fetches the next PRD table entry 138 from the PRD table 137 associated with I/O channel 0. Element 152 is then operable to transfer the data block identified by the fetched PRD entry 138 between the I/O device and main memory 130. Element 154 is then operable to test whether the fetched PRD entry 138 has the end of transfer bit set. If the fetched PRD entry 138 indicates that it is the end of the I/O request transfer, element 156 is then operable to signal CPU 34 that the I/O request data transfer has been completed. One arrow out of element 156 is directed back to element 140 to indicate that the processing within CPU 34 which may initiate another I/O request to channel 0 may continue. Processing of elements 140, 142, 144, 146, and 148 within CPU 34 paused awaiting the signal of completion of the I/O request by element 156. Processing of the method within CPU 34 then continues with element 140. Processing of the method within I/O control device 120 then continues with element 168 to determine whether the I/O device on channel 1 is ready for the transfer of additional data. If the channel 1 device is ready to transfer data, processing continues with element 151 as discussed below. Otherwise, processing continues with element 158 as discussed above to select the next device ready for transfer of data.

If operation of element 154 determines that the fetched PRD entry 138 does not have the end of transfer bit set, then processing continues with element 164 to determine whether the I/O device on channel 1 is ready for the transfer of additional data. If the channel 1 device is ready to transfer data, processing continues with element 151 as discussed below. Otherwise, processing continues with element 166 to determine whether channel 0 device is again ready to transfer data. If channel 0 device is again ready to transfer data, then processing continues with element 150 as discussed above. Otherwise, processing continues with element 158 as discussed above to select the next device ready for transfer of data.

In response to selection of channel 1 by operation of element 162, element 151 fetches the next PRD table entry 138 from the PRD table 137 associated with I/O channel 1. Element 153 is then operable to transfer the data block identified by the fetched PRD entry 138 between the I/O device and main memory 130. Element 155 is then operable to test whether the fetched PRD entry 138 has the end of transfer bit set. If the fetched PRD entry 138 indicates that it is the end of the I/O request transfer, element 157 is then operable to signal CPU 34 that the I/O request data transfer has been completed. One arrow out of element 157 is directed back to element 141 to indicate that the processing within CPU 34 which may initiate another I/O request to channel 1 may continue. Processing of elements 141, 143, 145, 147, and 149 within CPU 34 paused awaiting the signal of completion of the I/O request by element 157. Processing of the method within CPU 34 then continues with element 141. Processing of the method within I/O control device 120 then continues with element 167 to determine whether the I/O device on channel 0 is ready for the transfer of additional data. If the channel 0 device is ready to the transfer data, processing continues with element 150 as discussed below. Otherwise, processing continues with element 158 as discussed above to select the next device ready for transfer of data.

If operation of element 155 determines that the fetched PRD entry 138 does not have the end of transfer bit set, then processing continues with element 165 to determine whether the I/O device on channel 0 is ready for the transfer of additional data. If the channel 0 device is ready to transfer data, processing continues with element 150 as discussed below. Otherwise, processing continues with element 169 to determine whether channel 1 device is again ready to transfer data. If channel 1 device is again ready to transfer data, then processing continues with element 151 as discussed above. Otherwise, processing continues with element 158 as discussed above to select the next device ready for transfer of data.

At steps 156 or 157 (depending upon which channel is being used), the I/O control device 120 signals that the requested data transfer is complete. The I/O control device 120 typically signals the processor when all of the requested data has traveled through the I/O control device's 120 internal FIFOs and has been written successfully to either main memory 130 or to the I/O device. An I/O device on the alternate channel will continue operation following completion of a PRD table by the original channel.

Elements 164 and 168 for channel 0 and 165 and 167 for channel 1 determine whether the opposite channel is ready to transfer data at the end of the transfer of a contiguous block through their respective associated channels. These elements implement the "swap" feature of the methods of the present invention to enable the transfer of data between the I/O control device 120 and main memory 130 based upon the availability of data from the I/O channels. Prior approaches failed to fully utilize the bandwidth of an I/O control device in the transfer of data between main memory and I/O devices. The channel would remain idle while the data manager circuits remained dedicated to a particular I/O device despite the fact that the I/O device was idle waiting for transfer of additional data. This "swap" method of the present invention provides improved bandwidth utilization duplication of complex data manager circuits as known in prior designs.

The "swap" methods of the present invention may be easily extended by one of ordinary skill in the art to manage more than two I/O devices/channels with each data manager as well as to duplicate the data managers, each of which is capable of managing data transfers for a plurality of I/O channels/devices.

Description of Preemption Mechanism

The preferred method provides the capability to non-destructively preempt bus master operation of the data manager 124 in conjunction with either I/O device at any time during the transfer process. Two types of preemption exist, a preemption during mechanical or network delays prior to data transfer across the I/O bus, and preemption during active DMA data transfers. The first type of preemption (i.e. prior to DMA data transfer during mechanical or network delays of the I/O device to prepare for data transfer) is depicted by the operation at the 'Yes' exit point from test element 158 of FIG. 5. The second type of preemption (i.e. during active DMA data transfers) is depicted at the 'Yes' exit point from each of test elements 154 and 155 of FIG. 5.

During preemption, the process/program clears the start scatter/gather command from the I/O control device for the preempted channel and evaluates the appropriate descriptor table pointer.

If the pointer contains the address of the last PRD table entry from a previously executed PRD table, then the preemption is of the "prior to DMA" type. The process/program clears the active I/O device command, sends a new DMA command to the desired I/O device, rewrites the PRD tables, saves the current descriptor pointer register, rewrites the descriptor pointer register, and sends a new start scatter/gather command to the I/O control device. When the preempting PRD table has completed it's transfer, the previously saved descriptor pointer register is reloaded following the reissuing of the DMA command to the preempted I/O device.

If the pointer contains the address of any PRD table entry from the current PRD table, then the preemption is of the "during DMA" type. The process/program writes a "stop after current table entry" command to the I/O control device. The data manager will complete the current PRD table entry's DMA, then interrupt the processor.

The process/program clears the active I/O device command, sends a new DMA command to the desired I/O device, rewrites the PRD tables, saves the current descriptor pointer register, rewrites the descriptor pointer register, and sends a new start scatter/gather command to the I/O control device. When the preempting PRD table has completed its transfer, the previously saved descriptor pointer register is reloaded following the reissuing of the abbreviated DMA command to the preempted I/O device.

Merging of Concurrent Interrupts

As previously described, multiple contiguous memory blocks 140 defined by PRD table entries 138 in a scatter/gather PRD table 137 or 139 are transferred between main memory 130 and a specific I/O device. Following the final data transfer controlled by the last entry in a PRD table, the processor (CPU 34) is typically interrupted by the I/O control device 120. A plurality of concurrent data transfer operations for multiple I/O devices on multiple I/O channels complete their respective data transfers based on time scales that are not deterministic in nature. This characteristic of concurrent I/O channel operation requires a mechanism to associate a given interrupt with the responsible I/O device, channel and operation. Furthermore, concurrent I/O operations could generate multiple, overlapping interrupts requiring either a hardware interrupt queuing logic, or complex interrupt handling software for the host processor.

Figure 6A:
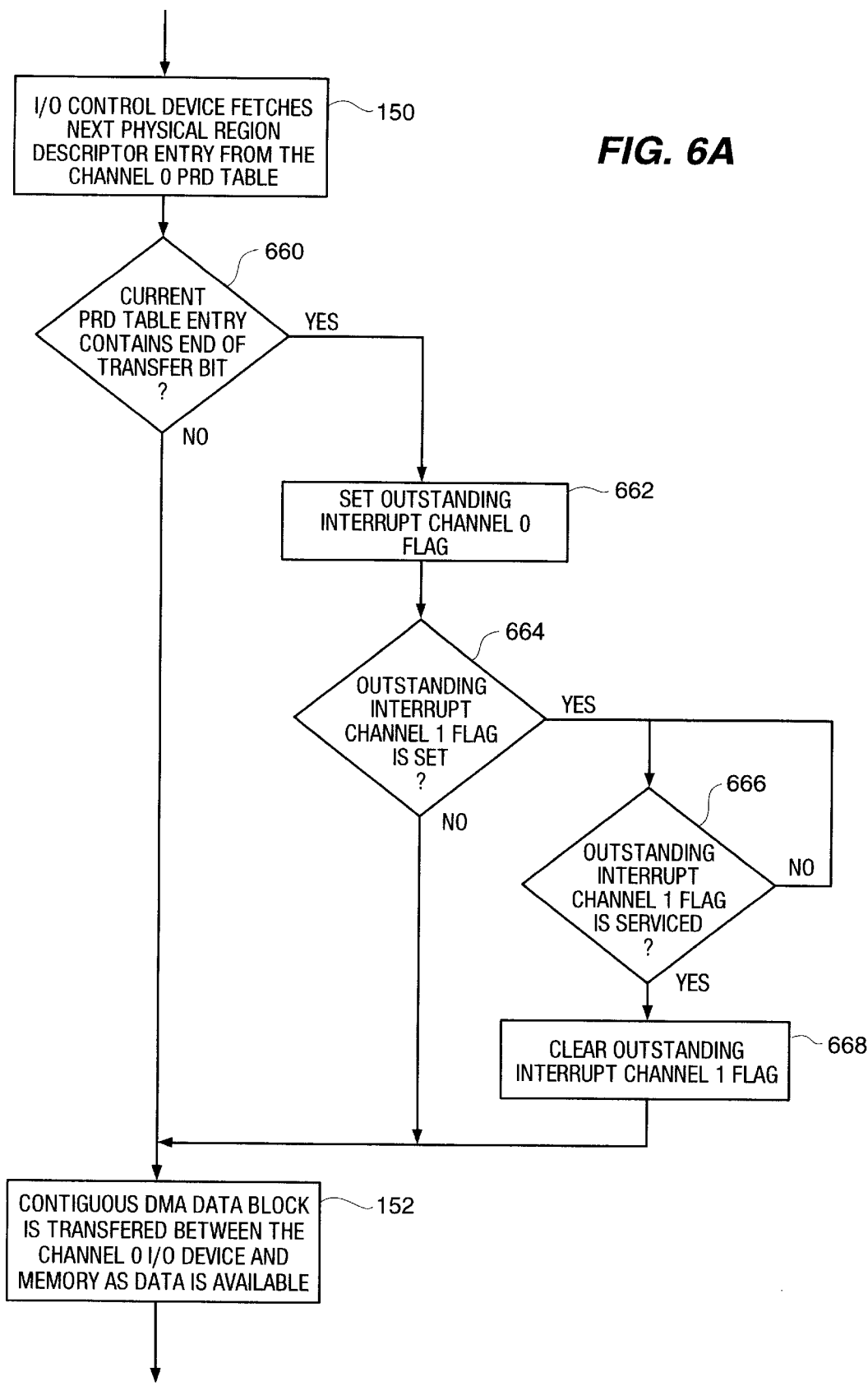
FIG. 6 shows a method for merging concurrent interrupts.
Figure 6B:
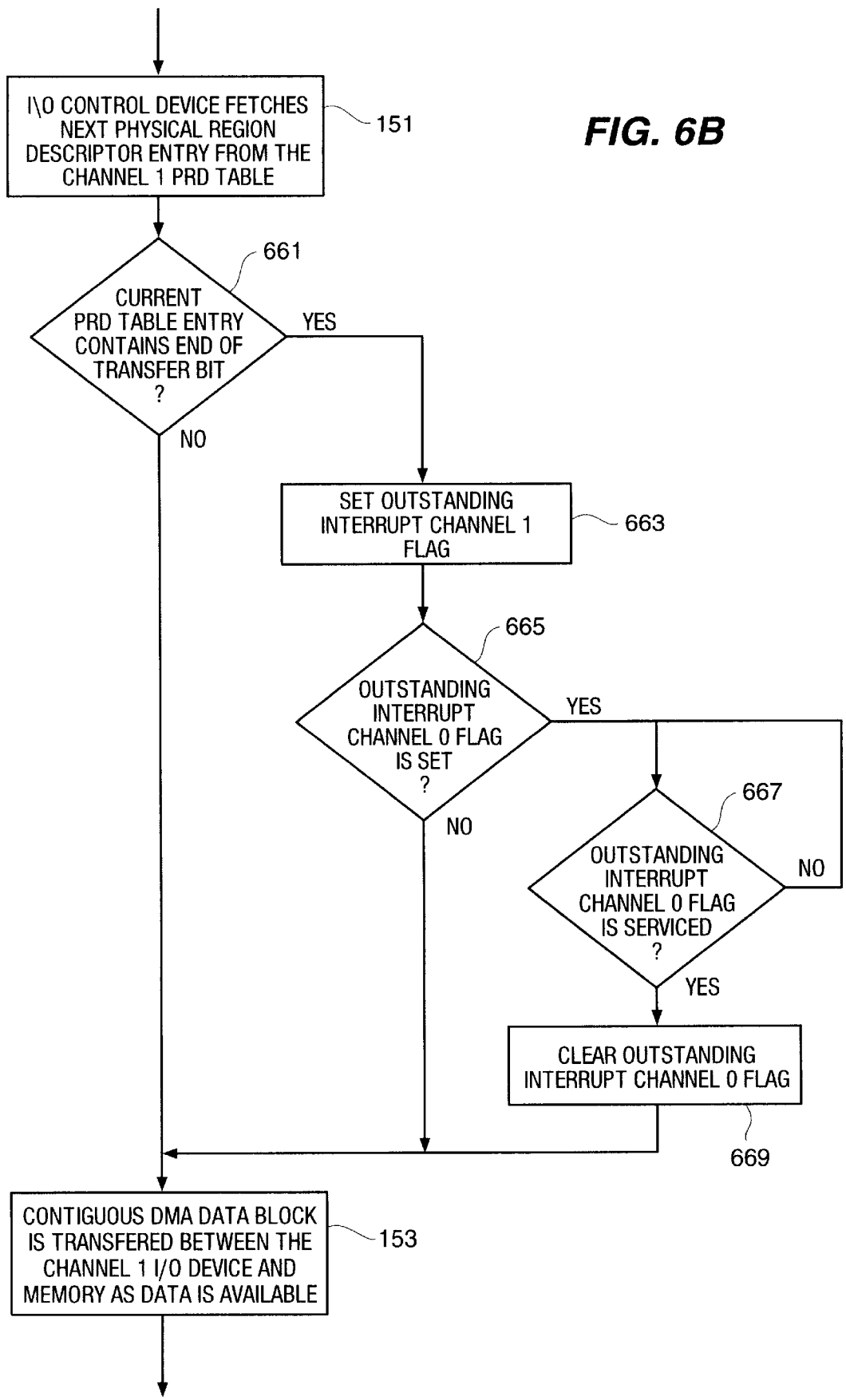
Figure 6C:
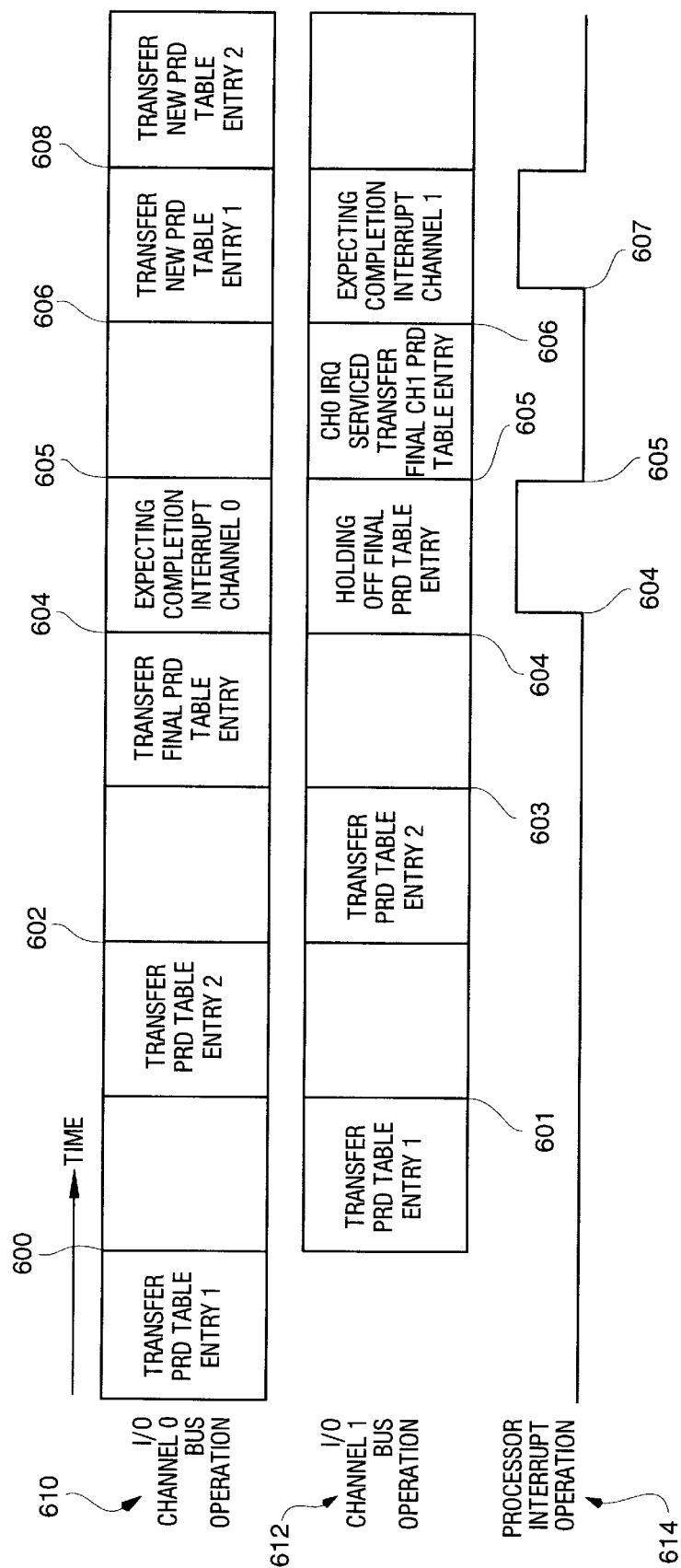

As shown in FIG. 6, the present invention controls interrupt generation through selective arbitration. When a scatter/gather transfer reaches it's final PRD table entry 138 (end of transfer bit set), a CPU 34 interrupt is imminent and will occur following the successful completion of data transfer controlled by that PRD table entry 138. Other channels' concurrent scatter/gather DMA transfers are allowed to proceed through their respective PRD tables (i.e. 137 or 139) so long as they are not executing a final block transfer PRD entry 138 (end of transfer bit set) themselves. If another final PRD table entry 138 (end of transfer bit set) transfer is encountered by the data manager 124 in managing a data transfer for another I/O channel, its operation is deferred until the first channel's transfer completion interrupt has been serviced by the CPU 34. If more than two active I/O channels exist, and both previous channels have reached last table entry status, the third I/O channel will proceed with scatter/gather DMA transfer operations so long as that channel doesn't encounter an imminent end of table condition prior to the CPU 34 servicing anticipated or outstanding previous data transfer completion interrupts.

Thus, the described techniques provide discrete, non-overlapping interrupts to signal the completion of each I/O block transfer request to the host processor. This capability minimizes the complexity and improves the performance of the host processor's interrupt handling software, when managing concurrent I/O transfers. Prior methods for handling concurrent interrupts required interrupt queues or complex interrupt handling software running on the host CPU.

FIG. 6 depicts three times line figures 610, 612, and 614. Time line 610 shows operations on channel 0 as time proceeds left to right. Time line 612 shows operations on channel 1 as time proceeds left to right, and time line 614 shows the interrupt signal applied to CPU 34 by I/O control device 120 corresponding to the interrupts generated by operations on channels 0 and 1. Specific times along the time lines are shown as vertical lines and are labelled with reference numbers 600–609. Channel 0 completes the transfer defined by its first PRD entry 138 at time 600 and its second PRD entry 138 at time 602. Channel 1 completes the transfer defined by its first PRD entry 138 at time 601 and its second PRD entry 138 at time 603. At time 603 channel 0 operation encounters the final PRD entry 138 in its current PRD table 137. At time 609 the transfer defined by the final PRD entry 138 for channel 0 completes and the interrupt signal (IRQ) is applied to CPU 34 by control device 120. At time 604 channel 1 operation encounters its final PRD entry 138 but holds off the specified transfer until time 605 when the CPU 34 has acknowledged the interrupt generated at time 609 by completion of the transfer defined by the final PRD entry 138 in channel 0 operation. Channel 1 completes its final transfer at time 606 and applies an interrupt signal (IRQ) to CPU 34 at time 607. Channel 0 operation is shown to initiating new transfers at times 606 and 608 for a new I/O request generated by CPU 34.

FIG. 6 also provides flowcharts depicting the modifications to the control flow of FIG. 5 required to coordinate the interrupt processing as described above. Elements 660, 662, 664, 666, and 668 are operable between elements 150 and 152 of FIG. 5 to control the interrupt signal generated by operation of channel 0. Elements 661, 663, 665, 667, and 669 are operable between elements 151 and 153 of FIG. 5 to control the interrupt signal generated by operation of channel 1. After element 150 fetches the next PRD entry 138 from the PRD table 137 for channel 0, element 660 is operable to determine whether the fetched PRD entry 138 has the end of transfer bit set. If the end of transfer bit is not set, operation continues with element 152 to transfer the data as defined by the fetched PRD entry. Otherwise, element 662 is operable to set a flag indicating that channel 0 has an outstanding interrupt condition yet to be applied to CPU 34. Element 664 is next operable to determine whether channel 1 also has an outstanding interrupt as indicated by an analogous flag. Processing continues with element 152 to transfer the identified memory block 140 if element 664 determines that channel 1 does not have its outstanding interrupt flag bit set. Otherwise processing continues by looping on element 666 until the outstanding interrupt indicated with respect to channel 1 is serviced by CPU 34 (as indicated by status information associated with bus 21 and bridge 36 and well known to those of ordinary skill in the art). When element 666 determines that channel 1's outstanding interrupt has been serviced by CPU 34, processing continues with element 668 to clear the flag indicating an outstanding interrupt is pending on channel 1. Processing then continues with element 152 as discussed above.

Elements 661, 663, 665, 667, and 669 are operable between elements 151 and 153 of FIG. 5 to control the interrupt signal generated by operation of channel 1. After element 151 fetches the next PRD entry 138 from the PRD table 139 for channel 1, element 661 is operable to determine whether the fetched PRD entry 138 has the end of transfer bit set. If the end of transfer bit is not set, operation continues with element 153 to transfer the data as defined by the fetched PRD entry. Otherwise, element 663 is operable to set a flag indicating that channel 1 has an outstanding interrupt condition yet to be applied to CPU 34. Element 665 is next operable to determine whether channel 0 also has an outstanding interrupt as indicated by an analogous flag. Processing continues with element 153 to transfer the identified memory block 140 if element 665 determines that channel 0 does not have its outstanding interrupt flag bit set. Otherwise processing continues by looping on element 667 until the outstanding interrupt indicated with respect to channel 0 is serviced by CPU 34 (as indicated by status information associated with bus 21 and bridge 36 and well known to those of ordinary skill in the art). When element 667 determines that channel 0's outstanding interrupt has been serviced by CPU 34, processing continues with element 669 to clear the flag indicating an outstanding interrupt is pending on channel 0. Processing then continues with element 153 as discussed above.

One of ordinary skill in the art will recognize that the methods identified above with respect to merging of interrupts for channels 0 and 1 may be easily extended to merging the interrupt processing for "n" I/O channels whose data transfers are managed by a single data manager 124 in an I/O control device 120.

Data Manager Arbitration and Selection

First order data manager selection and arbitration of the present invention (elements 158, 160, and 162 of FIG. 5) is based on the capability of a given I/O device to transfer data at any given point in time. Typical I/O devices contain internal buffers which allow data to be transferred to or from the I/O device at maximum I/O channel bandwidth rather than at the slower media or network bandwidths.

During I/O read operations, the I/O device requests data transfers to the I/O channel when internal memory buffers have been filled to a preconfigured "high watermark" level, insuring that the resulting DMA to the I/O channel efficiently utilizes the available I/O bus bandwidth. During I/O write operations, the I/O device requests data transfers from the I/O channel when internal memory buffers are at a "low watermark" level, once again allowing efficient utilization of the I/O bus bandwidth. First order data manager channel selection (element 160 of FIG. 5) is based directly on an I/O device's ability to transfer a block of data at any given point in time. This method is efficient due to the selection process being controlled by actual data availability from the I/O device during I/O reads, or buffer availability within the targeted I/O device during I/O writes. This method is much more cost efficient to implement because the anticipatory logic, bus monitoring logic and complex arbitration logic or software or alternative approaches is not required.

Thus, in summary, first order DMA scheduling (element 150 of FIG. 5) is on an as needed basis depending upon whether or not the targeted I/O devices have transferred enough data from (or to) media or the network to partially fill (or empty) the I/O device buffer. The apparatus allows various second order arbitration and scheduling techniques (element 162 of FIG. 5) to be used for scheduling bus master DMA operations among "n" data managers for "n+i" I/O channels when multiple I/O channels meet the first order constraints for bus mastership, while seeking the use of a data manager which has recently become idle. Well known arbitration algorithms such as round robin, first come first serve, least recently used, most recently used and random can be used for second order arbitration.

Figure 7:
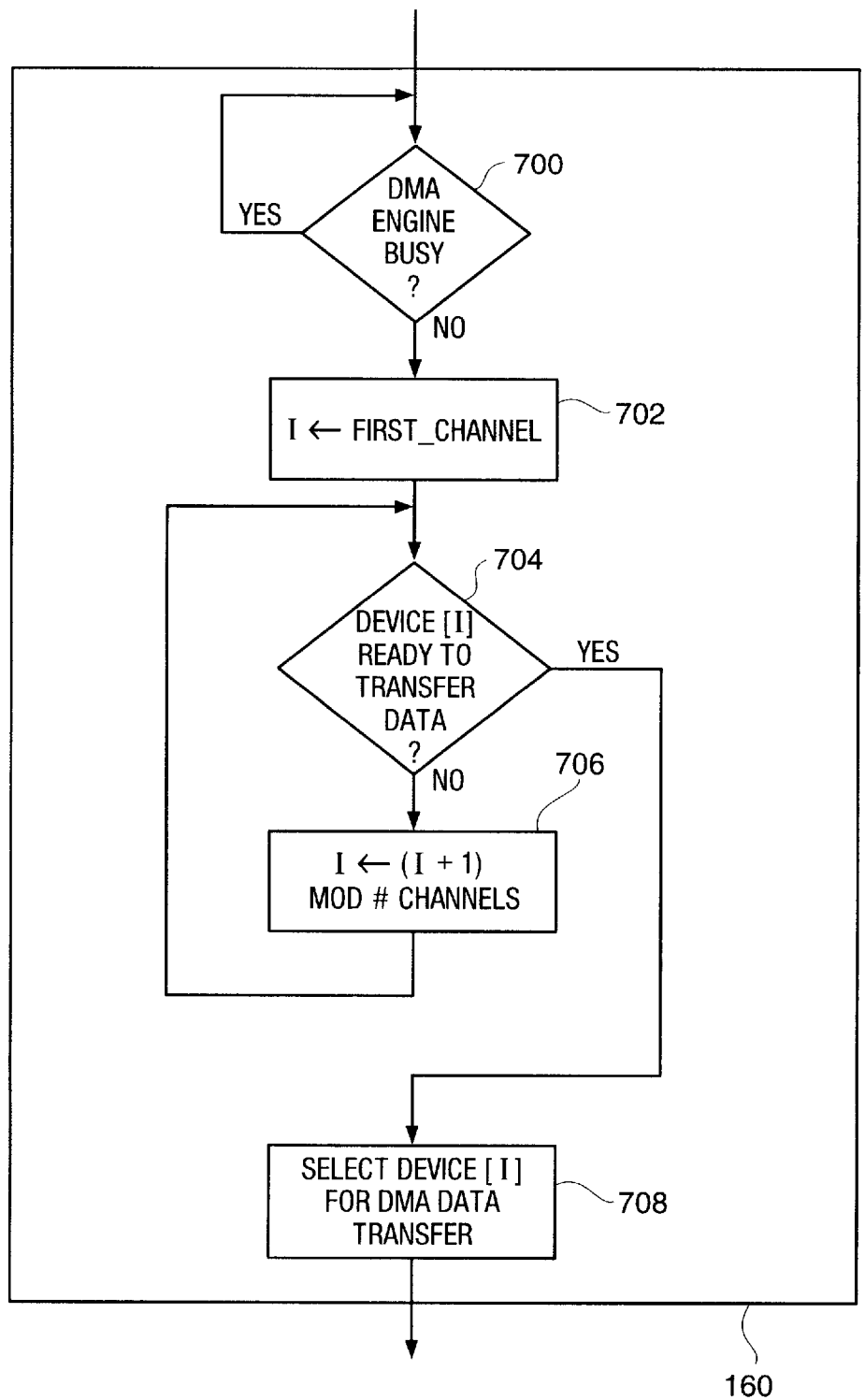
FIG. 7 shows a method for arbitration and selection by a data manager.

FIG. 7 shows the first order selection process (element 160 of FIG. 5) in additional detail. Element 700 is operable to await the availability of the DMA engine (data manager 124 of FIG. 4). Processing continues with element 702 when the data manager 124 is available for the transfer of a block of data. One of ordinary skill in the art will readily recognize that the processing of element 700 may be extended to handle a plurality of data manager circuits 124 within a single I/O control device 120. When a plurality of data managers 124 are contained within a control device 120, element 700 may be extended to chose an available data manager rather than waiting for a particular data manager 124. Each of the plurality of data managers 124 may be reconfigured to exchange data with any of the plurality of I/O channels by multiplexing techniques well known to those of ordinary skill in the art.

Element 702 is operable to set the variable I to the number of the first I/O channel to be tested for possible selection as available for data transfer. One of ordinary skill in the art will recognize several variations to the processing of element 702 to implement different selection methods. For example, if the FIRST_CHANNEL value is a constant, then the method will always prefer that channel over others to thereby establish a priority in the selection among channels ready for transfer. If the FIRST_CHANNEL value is a non-volatile static variable saved through each invocation of the selection process (element 160), then a round-robin method is implemented. The round-robin method starts a search for a "ready" I/O channel where the previous invocation's search terminated with a selected I/O channel. Other methods well known to those in the art may be implemented to sequence through the I/O channels to be tested for "readiness."

Elements 704 and 706 are operable repetitively in a loop to sequence through each channel device controlled by the I/O control device 120 until a device is located which is ready for another transfer of data. Element 704 tests device number "I" to determine whether it is ready for a transfer of data to or from main memory 130. This test varies depending upon the characteristics of the particular device attached to I/O channel number "I." Typically the test, as described above, involves determining whether the buffer memory associated with the device has reached a "high-watermark" (in the case of a read I/O request) or a "low-watermark" (in the case of a write I/O request). One of ordinary skill in the art will recognize that several other parameters may be tested to determine the "readiness" of a particular type of device. The test described in element 704 is intended to express any and all tests required for the I/O control device 120 to determine that a particular channel device is ready for transfer of additional data. Processing continues with element 708 if the device number "I" indicates its readiness for the transfer of additional data. Otherwise, processing continues with element 706 to increment the variable "I" to the next device number in a circular manner using modulo arithmetic. One of ordinary skill will recognize that the order of testing devices in the looping repetition of elements 704 and 706 need not be sequential in numeric increasing order as indicated by elements 704 and 706. A prioritized scheme, for example, may be employed to favor certain channel devices over others.

Element 708 is operable in response to element 704 determining that device number "I" is ready for additional data transfers. Element 708 selects devices number "I" by configuring the data manager 127 circuits to exchange data between the memory block 140 identified by the fetched PRD table entry 138 and the I/O device number "I". The PRD table entry 138 is fetched from the PRD table (137 or 139) associated with the selected I/O channel device.

Performance Improvements

Figure 8:
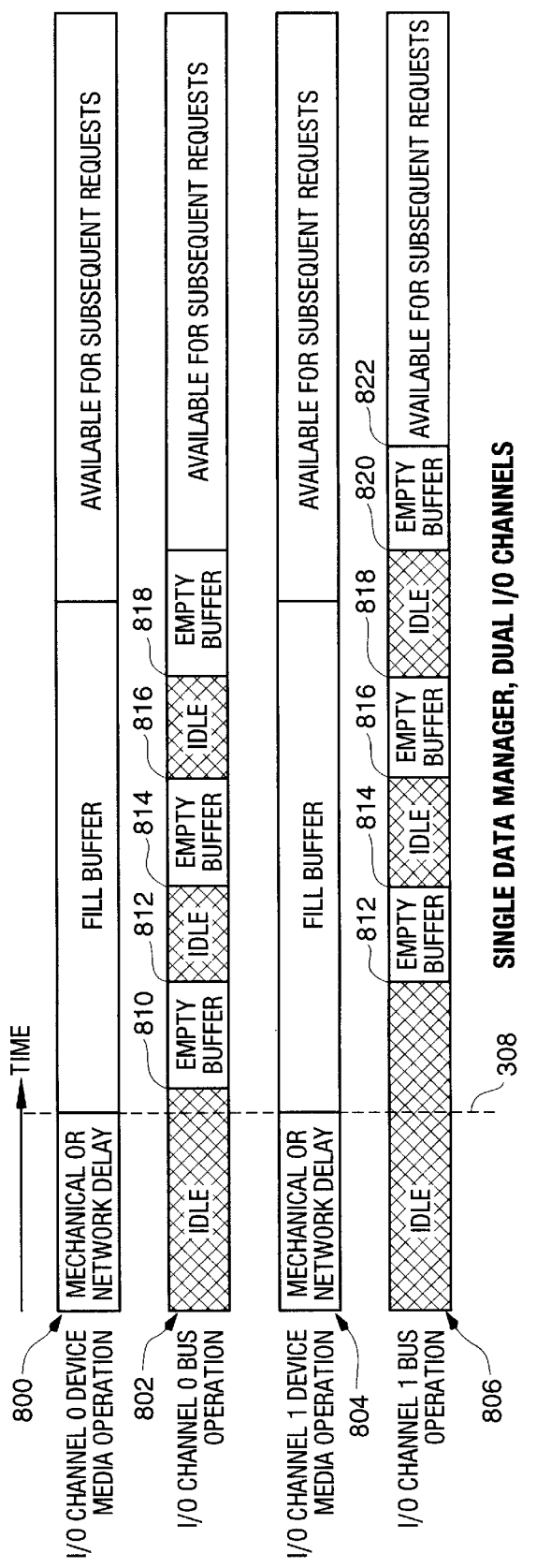
FIG. 8 contains performance analysis diagrams for present invention single data manager, dual I/O channel operations.

FIG. 8 shows that the preferred method described hereinabove efficiently utilizes the buffering capabilities of the I/O devices as well as the bandwidth of the two I/O channels. It should be noted that, similar to the assumptions given with respect to FIG. 3, the I/O channel is idle when the active I/O device's buffer has been emptied by the I/O channel DMA. In other words, the I/O channels shown in FIG. 6 perform at a bandwidth of twice the media rate of the I/O device.

A comparison of FIG. 8 with FIG. 3A shows that the single data manager solution of the present invention performs almost as well as the previously described dual data manager solution. A similar comparison of FIG. 8 with FIG. 3B reveals that the single data manager multiplexed I/O solution of the present invention significantly out performs the previously described single data manager, dual I/O solution. Furthermore, the process/program can tune the I/O transfer performance by modifying the transfer size and number of the PRD table entries based on the I/O devices' buffer size, media rate and priority.

Specifically, FIG. 8 depicts typical utilization over time of a single data manager used in accord with the multiplexing I/O methods of the present invention. A single data manager may be utilized to exchange data with multiple I/O devices. However, unlike FIG. 3B, the exchange is performed in such a manner that the previously unused idle time of the single data manager in FIG. 3B is utilized to exchange data with another I/O channel device ready for data transfer. In FIG. 8, four time lines are depicted to describe the operation of two I/O devices managed by a single data manager. The operation of the single data manager 124 exchanging data over bus 21 with main memory 130 is indicated by two time lines, namely, 802 and 806. The operation of each I/O device or channel is indicated by time line 800, and 804, respectively. As depicted in FIG. 8, time proceeds from left to right. Points of time along the horizontal time axis are referenced by vertical lines labeled 808–822.

Two devices, namely channel 0 device depicted by time line 800, and channel 1 device depicted by time line 804, are both ready to exchange data with main memory at time reference 808 following an initial delay for network or mechanical initiation of communications. At time reference 808, both devices begin filling their respective buffers. The corresponding operation of the single data manager 124 exchanging data over bus 21 with main memory 130 is indicated in time lines 802 and 806. At time reference 810, the single data manager 124 is operating in conjunction with channel 0 device to empty the partially filled buffer associated with the device. At time reference 812, the single data manager 124 has completed emptying the buffer associated with channel 0 device. Rather than remain idle as in prior approaches, single data manager 124 "swaps" to another I/O device ready to exchange data. Namely, at time reference 812, single data manager 124 begins exchanging data over bus 21 between main memory 130 and I/O channel device 1 as shown in timeline 804. At time reference 814 having emptied the buffer associated with channel 1 device, the single data manager 124 again "swaps" to channel 0 device to begin emptying its associated buffer. The sequence continues wherein the single data manager 124 swaps between bus master activity on behalf of channel 0 and channel 1 continues, swapping again at time reference 816, 818, and finally at 820. At time reference 822, the single data manager 124 has completed its interaction with both channels 0 and 1.

It can be seen from FIG. 8 that the single data manager 124 of he present invention is better utilized than the single data manager 24 whose timeline usage is depicted in FIG. 3B. Whereas in FIG. 3B, the single data manager 24 is idle approximately 50% of the time beginning at time reference 312 and ending at time reference 332, the single data manager 124 whose timeline is depicted in FIG. 8 is nearly 100% utilized from time reference 810 through 822. Utilizing the previously idle time of prior approaches to multiplex over a plurality of I/O channels permits a single data manager 124 of the present invention to be more efficiently utilized to maintain the bus master data transfer bandwidth to the main memory 130.

Operating Modes

Figure 9:
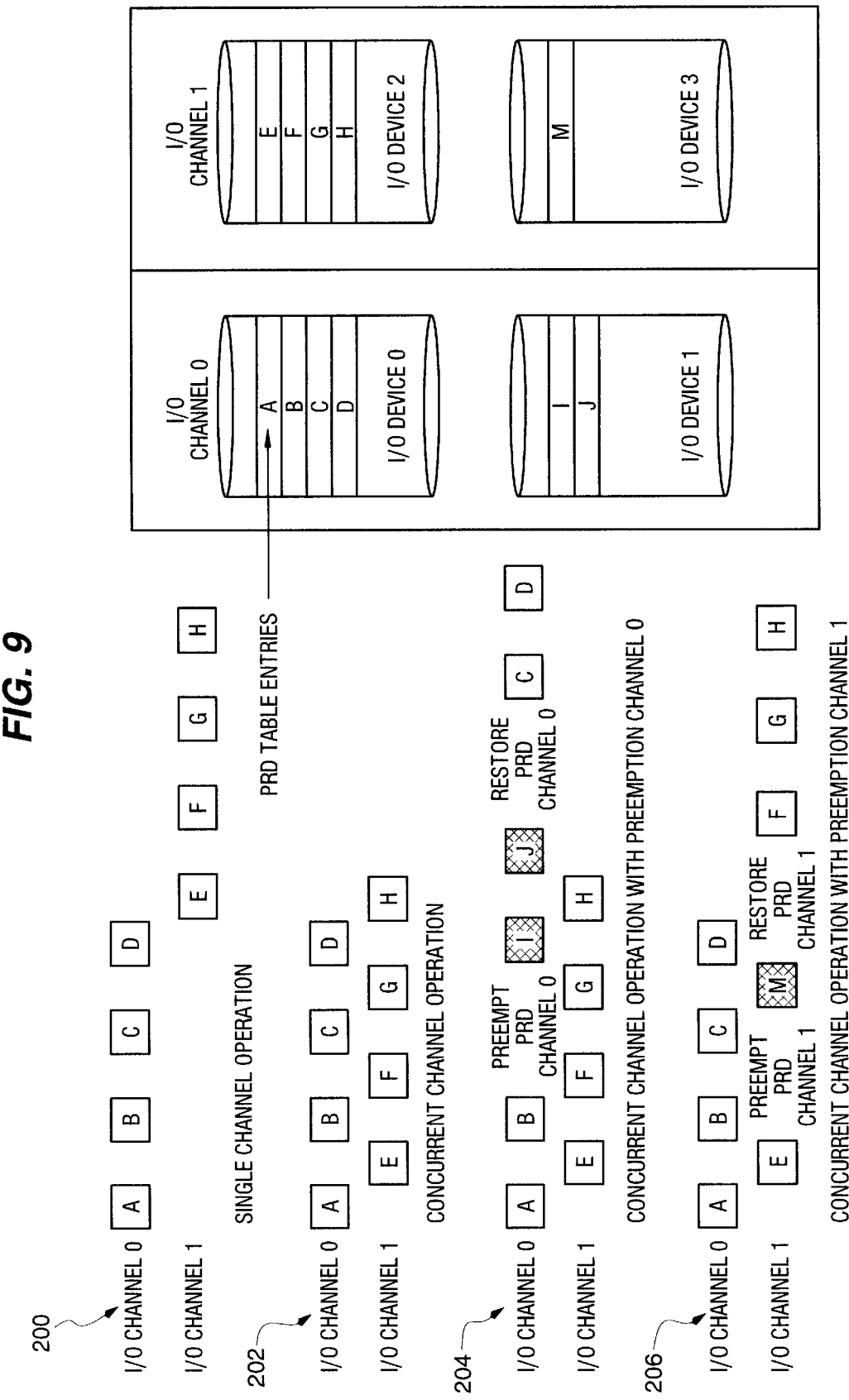
FIG. 9 contains diagrams showing possible modes of operation supported by the current invention.

The data manager of the present invention is programmable in that it may operate in many different modes based on programmable selections in the configuration of the data manager. Typical operation modes allowed by the present invention are shown in FIG. 9. A single channel operation compatible with the prior approaches is shown at 200, where channel 0 transfers blocks A, B, C and D, followed by channel 1 transfer of blocks E, F, G and H. In other words, the data manager of the present invention is capable of operating in a manner compatible with prior designs wherein a single data manager serves a plurality of devices sequentially. Each channel is serviced until the requested data transfer is completed. While the data manager is associated with a single channel (i.e. transferring blocks A, B, C, and D), data intended for exchange with other I/O channels (i.e. blocks E, F, G, and H) remains pending. In addition, as described above with reference to FIG. 3B, the data manager remains idle and unused for a significant portion of time during the transfers.

Concurrent channel operation as described above with reference to FIG. 8 is shown at 202, where the transfer of blocks A, B, C and D with channel 0 are interleaved with the transfer of blocks E, F, G and H with channel 1. Although individual blocks are not transferred concurrently, but rather interleaved, the overall data transfer can be viewed as being concurrent. As seen in 202 and as above with respect to FIG. 8, the data manager is more fully utilized by using the idle time shown in 200 of FIG. 9 to exchange data with another I/O channel device.

Concurrent channel operation with channel 0 preemption is shown at 204, where data relating to another device on a particular channel (in this example blocks I and J from a device 1 on channel 0) preempts the transfer of data from a device on the same channel (in this example, blocks A, B, C and D from device 0 on channel 0). The blocks are initially transferred similar to that shown with the normal concurrent channel operation of 202. However, prior to transferring block C, a preemption on channel 0 is received. The present operating status of the data manager with respect to channel 0 is saved and the status is changed to reflect the preemptive operation on channel 0 with respect to device number 1. Channel 1 then continues DMA transfer of its next block of data (block G). Channel 0 then transfers a block of data (block 1) from the preemptive second device on channel 0. Channel 1 then continues DMA transfer of its next block of data (block H). Channel 0 then transfers the next block of data (block J) from the preemptive second device on channel 0. As this second device has no more data to transfer, the original saved status for channel 0 is restored, and data transfer from the first device on channel 0 continues with the transfer of blocks C and D.

Concurrent channel operation with channel 1 preemption is shown at 206. This operates in an analogous fashion to that just described with respect to the preemptive channel 0 operation of 204. Hence, further discussion is not needed.

System Environments

Figure 10:
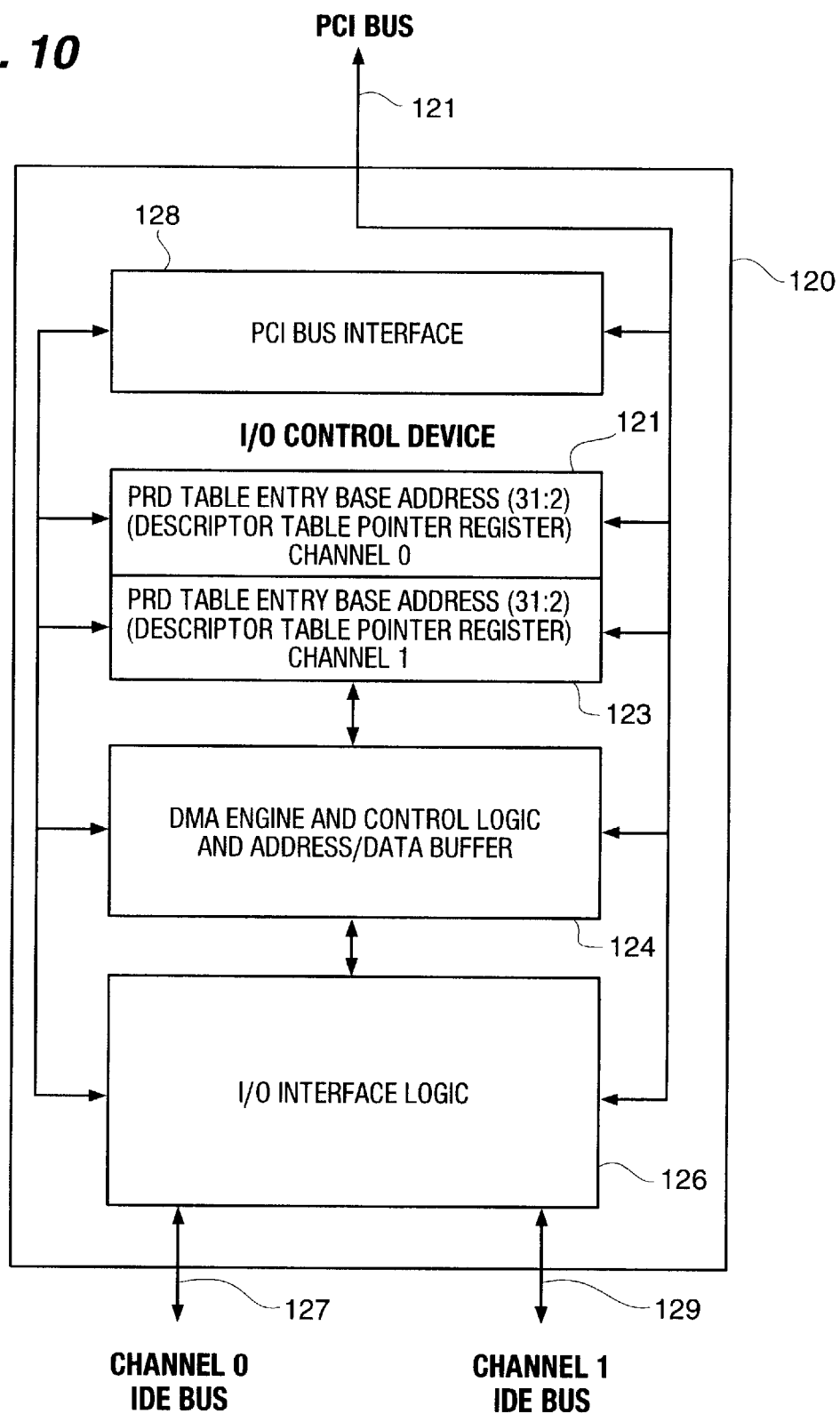
FIG. 10 is a block diagram of the preferred operating environment of this invention, using a PCI/Dual IDE I/O channel control device.

FIG. 10 shows the I/O control device 120 used in the preferred system environment. As shown, the preferred environment is for use in interfacing two channels of an IDE bus with a PCI bus. IDE buses and PCI buses are well known in the art. The I/O control device 120 allows for a more efficient DMA transfer in such an environment, as previously described.

Figure 11:
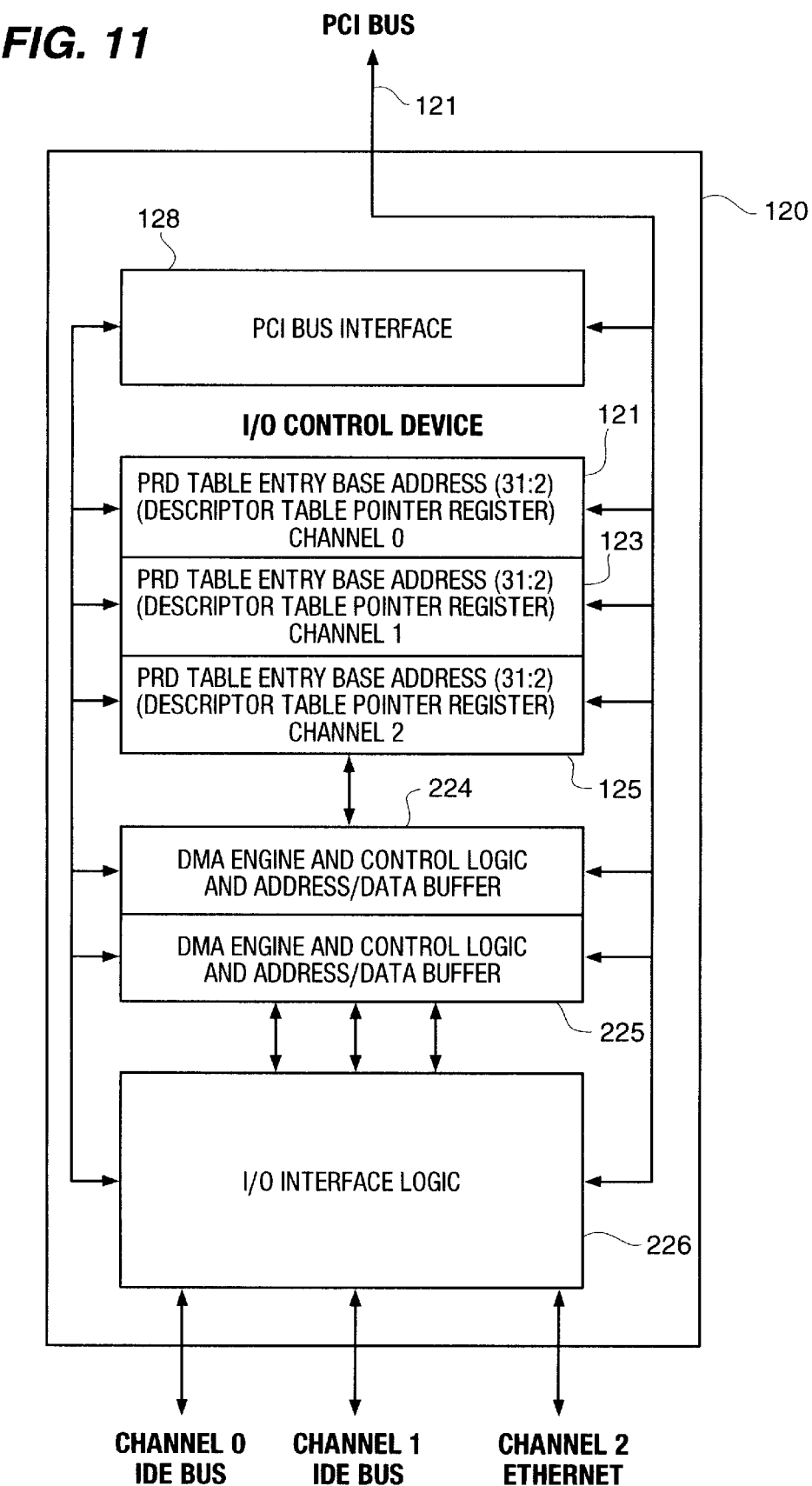
FIG. 11 is a block diagram of an alternate operating environment of this invention, using a PCI/Dual IDE/ Ethernet I/O channel control device.

FIG. 11 shows an alternate system environment to that of FIG. 10. The techniques described herein can be extended to support two channels of an IDE bus in addition to an Ethernet channel. In order to achieve such expansion, an additional descriptor pointer register 125 for channel 2 is added. An additional DMA engine 225 is also added to provide specific DMA interface support for the additional channel. This DMA engine would operate in similar fashion to that shown in FIG. 5, but only having flow control for managing a single channel (as opposed to the two channels shown in FIG. 5).

The above described apparatus and method provides a mechanism for performance tuning DMA transfers between main memory and I/O devices, based on the media or network bandwidth and buffer size of the I/O device. Slower I/O devices (i.e. CDROMS, tape drives or Ethernet network devices) are controlled using a larger number of scatter/gather PRD table entries having a smaller block transfer size. Faster I/O devices (i.e. hard disk drives or fiber channel switch fabric ports) are controlled using a smaller number of scatter/gather PRD table entries having a larger block transfer size. Likewise, I/O devices having smaller buffer sizes are controlled using a larger number of scatter/gather PRD table entries having a smaller block transfer size. I/O devices having larger buffer sizes may be controlled using a smaller number of scatter/gather PRD table entries having a larger block transfer size. Software may easily tune the I/O controller to provide balanced, high aggregate bandwidth system performance.

While we have illustrated and described the preferred embodiments of our invention, it is to be understood that we do not limit ourselves to the precise constructions herein disclosed, and the right is reserved to all changes and modifications coming within the scope of the invention as defined in the appended claims.

What is claimed is:

1. A method operable in an I/O control device in a data processing system for exchanging blocks of data between a memory and a plurality of I/O devices through a data manager circuit in said I/O control device, said method comprising the steps of:

associating first and second I/O devices with respective first and second memory tables; and interleaving the blocks of data by transferring data corresponding to the first memory table and then transferring data corresponding to the second memory table.

2. The method of claim 1 wherein the interleaving step includes the steps of:

(c) selecting a ready one of the plurality of I/O devices;

(d) exchanging a portion of the data between said memory and the selected ready one of said plurality of I/O devices; and (e) repeating steps (c) and (d) until all the data is exchanged.

3. The method of claim 2 wherein the selecting step includes the steps of:

(f) applying a priority to each of the plurality of I/O devices ready to exchange data with said memory; and (g) selecting the highest priority I/O device from among the ready ones of said plurality of I/O devices.

4. The method of claim 3 wherein said plurality of I/O devices includes at least two disk drive devices.

5. The method of claim 3 wherein said plurality of I/O devices includes at least two disk drive devices and one network interface device.

6. The method of claim 5 wherein said I/O control device includes at least two data manager circuits and further comprising the step of:

(h) allocating an available data manager circuit to perform the request exchange of the data between said memory and the selected ready one of said plurality of I/O devices.

7. The method of claim 1 further comprising the step of constructing the first and second memory tables in the memory before the I/O request is initiated to the I/O control device.

8. The method of claim 1 wherein the associating step includes writing respective starting addresses of the first and second memory tables in first and second registers that correspond to the first and second I/O devices.

9. An I/O control device in a data processing system for exchanging blocks of data between a memory and a plurality of I/O devices through a data manager circuit in said I/O control device, said I/O control device comprising:

means for receiving requests from said data processing system to exchange identified data between said memory and identified ones of said plurality of I/O devices; and means for interleaving the requested exchanges of the identified data between said memory and the identified ones of said plurality of I/O devices, wherein said interleaving swaps between the identified ones of said plurality of I/O devices which are ready to exchange data with said memory.

10. The I/O control device of claim 9 wherein the means for interleaving includes:

means for selecting a ready one of the identified ones of said plurality of I/O devices; and means for exchanging a portion of the identified data between said memory and the selected ready one of said plurality of I/O devices.

11. The I/O control device of claim 10 wherein the means for selecting includes:

means for applying a priority to each of the identified ones of said plurality of I/O devices ready to exchange data with said memory; and means for selecting the highest priority I/O device from among the ready identified ones of said plurality of I/O devices.

12. The I/O control device of claim 11 wherein said plurality of I/O devices includes at least two disk drive devices.

13. The I/O control device of claim 11 wherein said plurality of I/O devices includes at least two disk drive devices and one network interface device.

14. The I/O control device of claim 13 wherein said I/O control device includes at least two data manager circuits and includes:

means for allocating an available data manager circuit to perform the requested exchange of the identified data between said memory and the selected ready one of said plurality of I/O devices.

15. A method operable in an I/O control device in a data processing system for exchanging blocks of data between a memory and a plurality of I/O devices through a data manager circuit in said I/O control device, said method comprising the steps of:

transferring data associated to an entry of a memory table that corresponds to a first I/O device; and transferring data associated to an entry of another memory table that corresponds to a second I/O device, wherein the transferring steps are interleaved.

16. A method operable in an I/O control device in a data processing system for exchanging blocks of data between a memory and a plurality of I/O devices through a data manager circuit in said I/O control device, said method comprising the steps of:

storing an entry address of a first memory table in a first device that corresponds to a first I/O device;

storing an entry address of a second memory table in a second device that corresponds to a second I/O device;

alternatingly transferring data associated with the entry address of the first memory table and data associated with the entry address of the second memory table; and incrementing the entry addresses of the first and second memory tables.

17. An I/O control device in a data processing system for exchanging blocks of data between a memory and a plurality of I/O devices through a data manager circuit in said I/O control device, said I/O control device comprising:

a first register, associated with a first I/O device, for storing addresses of a first memory region; and a second register, associated with a second I/O device, for storing addresses of a second memory region, wherein each of the addresses are incremented after the start of an interleaved transfer of data.

* * * * *